US012109684B2

(12) United States Patent
Nagakari et al.

(10) Patent No.: US 12,109,684 B2
(45) Date of Patent: Oct. 8, 2024

(54) CONTROLLER, CONTROL METHOD, AND PROGRAM

(71) Applicant: SONY CORPORATION, Tokyo (JP)

(72) Inventors: Satoko Nagakari, Chiba (JP); Tetsuya Narita, Hokkaido (JP); Kazuhito Wakana, Tokyo (JP); Kazuo Hongo, Chiba (JP); Wataru Kokubo, Tokyo (JP); Yoshinao Sodeyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 754 days.

(21) Appl. No.: 17/053,207

(22) PCT Filed: Jun. 6, 2019

(86) PCT No.: PCT/JP2019/022597
§ 371 (c)(1),
(2) Date: Nov. 5, 2020

(87) PCT Pub. No.: WO2019/244661
PCT Pub. Date: Dec. 26, 2019

(65) Prior Publication Data
US 2021/0129347 A1    May 6, 2021

(30) Foreign Application Priority Data
Jun. 22, 2018   (JP) ................. 2018-118928

(51) Int. Cl.
*B25J 13/08*    (2006.01)
*B25J 15/08*    (2006.01)

(52) U.S. Cl.
CPC ............. *B25J 13/085* (2013.01); *B25J 15/08* (2013.01)

(58) Field of Classification Search
CPC ........ B25J 13/085; B25J 15/08; B25J 9/1612; B25J 13/083; B25J 9/16; B25J 9/1633;
(Continued)

(56) References Cited

U.S. PATENT DOCUMENTS 4,605,354 A    8/1986    Daly
5,553,500 A *  9/1996    Grahn ............... G01L 1/255
                                              73/628
(Continued)

FOREIGN PATENT DOCUMENTS

CN    102666031 A    9/2012
CN    103913264 A    7/2014
(Continued)

OTHER PUBLICATIONS

Pei Di; Jian Huang; Shotaro Nakagawa; Kosuke Sekiyama; Toshio Fu, 2014 International Symposium on Micro-NanoMechatronics and Human Science (MHS), Dec. 31, 2014, Full text, Fall detection for elderly by using an intelligent cane robot based on center of pressure (COP) stability theory.

(Continued)

*Primary Examiner* — Bhavesh V Amin
(74) *Attorney, Agent, or Firm* — Paratus Law Group, PLLC

(57) ABSTRACT

A controller according to the present disclosure includes a whole-slip detecting unit (210) that detects, based on pressure information sent from a plurality of regions having different slipping characteristics when an object in contact with the plurality of regions is slipping, a state of a whole slip in which the object is slipping on each of the plurality of regions. An occurrence timing of the whole slip is different for each of the plurality of regions, and thus a state of a partial slip in which a part of the object is slipping is able to be detected, so that it is possible to detect a slip of the object with high accuracy.

17 Claims, 25 Drawing Sheets

(58) Field of Classification Search
CPC .... B25J 9/1694; B25J 9/1697; B25J 19/0095;
B25J 19/02; B25J 13/08; G01L 5/228;
G01L 5/00; G01L 5/009; G05B
2219/39533; G05B 2219/40567
See application file for complete search history.

(56) References Cited

U.S. PATENT DOCUMENTS

| | | | | |
|---|---|---|---|---|
| 5,844,146 | A * | 12/1998 | Murray | G01L 5/166 73/862.041 |
| 5,871,248 | A * | 2/1999 | Okogbaa | B25J 15/00 294/902 |
| 6,188,331 | B1 * | 2/2001 | Zee | G01L 5/228 73/628 |
| 6,243,623 | B1 | 6/2001 | Takenaka | |
| 7,663,362 | B2 * | 2/2010 | Kishida | G01R 33/04 73/862.391 |
| 7,984,658 | B2 * | 7/2011 | Kishida | G01L 1/146 73/862.391 |
| 8,033,189 | B2 * | 10/2011 | Hayakawa | B25J 13/084 901/46 |
| 8,181,540 | B2 * | 5/2012 | Loeb | G01L 5/228 901/33 |
| 8,272,278 | B2 * | 9/2012 | Loeb | G01L 5/228 374/45 |
| 8,359,931 | B2 * | 1/2013 | Nishiwaki | B66C 1/445 73/846 |
| 8,499,651 | B2 * | 8/2013 | Kishida | G01L 1/146 73/862.391 |
| 8,515,579 | B2 * | 8/2013 | Alcazar | B25J 9/1669 700/258 |
| 8,536,863 | B2 * | 9/2013 | Kishida | G01R 33/07 73/862.391 |
| 8,640,550 | B2 * | 2/2014 | Nishiwaki | B25J 15/00 73/846 |
| 8,640,551 | B2 * | 2/2014 | Nishiwaki | B66C 13/16 73/846 |
| 9,605,952 | B2 * | 3/2017 | Rose | B25J 9/1612 |
| 9,797,791 | B2 * | 10/2017 | Vogt | G01L 1/02 |
| 9,797,792 | B2 * | 10/2017 | Moore | G01L 1/205 |
| 9,841,331 | B2 * | 12/2017 | Wood | A61B 5/1036 |
| 10,527,507 | B2 * | 1/2020 | Wood | A43B 23/029 |
| 10,576,626 | B2 * | 3/2020 | Rose | B25J 13/08 |
| 11,016,598 | B1 * | 5/2021 | Song | H10N 30/857 |
| 11,162,858 | B2 * | 11/2021 | Wettels | G01L 1/146 |
| 11,313,743 | B2 * | 4/2022 | Luo | G01K 7/18 |
| 2007/0113681 | A1 | 5/2007 | Nishimura et al. | |
| 2007/0260355 | A1 | 11/2007 | Morimoto et al. | |
| 2009/0031825 | A1 * | 2/2009 | Kishida | G01L 5/228 73/862.621 |
| 2009/0076657 | A1 | 3/2009 | Tsuboi et al. | |
| 2009/0272201 | A1 * | 11/2009 | Loeb | G01L 5/228 73/862.041 |
| 2010/0090691 | A1 * | 4/2010 | Kishida | G01R 33/04 324/244 |
| 2010/0139418 | A1 * | 6/2010 | Loeb | G01L 5/228 73/862.046 |
| 2012/0067142 | A1 | 3/2012 | Shimojo et al. | |
| 2012/0316684 | A1 | 12/2012 | Lee | |
| 2015/0019013 | A1 * | 1/2015 | Rose | B25J 13/08 702/41 |

FOREIGN PATENT DOCUMENTS

| | | |
|---|---|---|
| CN | 106573370 A | 4/2017 |
| JP | S60161539 A | 8/1985 |
| JP | S61038887 A | 2/1986 |
| JP | H11267838 A | 10/1999 |
| JP | 2006017671 A | 1/2006 |
| JP | 2008-055540 A | 3/2008 |
| JP | 2012073051 A | 4/2012 |
| JP | 5003336 B2 | 8/2012 |
| JP | 5187552 B2 | 4/2013 |
| JP | 2013103306 A | 5/2013 |
| JP | 2013130530 A | 7/2013 |
| JP | 5257896 B2 | 8/2013 |
| WO | WO 2017/058700 A1 | 4/2017 |

OTHER PUBLICATIONS

Qian Mu-yun et al., Chinese Journal of Lasers, No. 8, Full text, Dec. 31, 2017, Tactile Sensing of Fiber Bragg Grating Based on Back Propagation Neural Network.

Zhang Qi-liang et al., Machinery Design & Manufacture, No. 4, Full text, Apr. 8, 2018, Clamping Mechanism's Design and Anti-tumble Stability's Analysis of a Conveying Robot.

De Maria Giuseppe et al: "Integrated force/tactile sensing: The enabling technology for slipping detection and avoidance", 2015 IEEE International Conference on Robotics and Automation (ICRA), IEEE, May 26, 2015 (May 26, 2015), pp. 3883-3889, XP033168954, DOI: 10.1109/ICRA.2015.7139740.

* cited by examiner

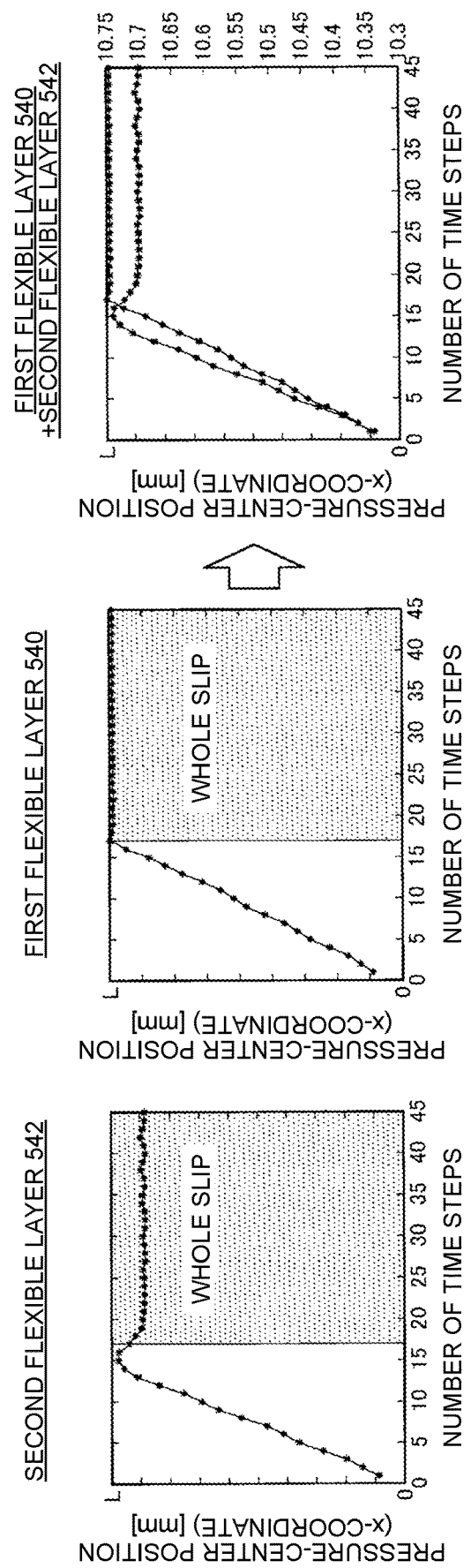

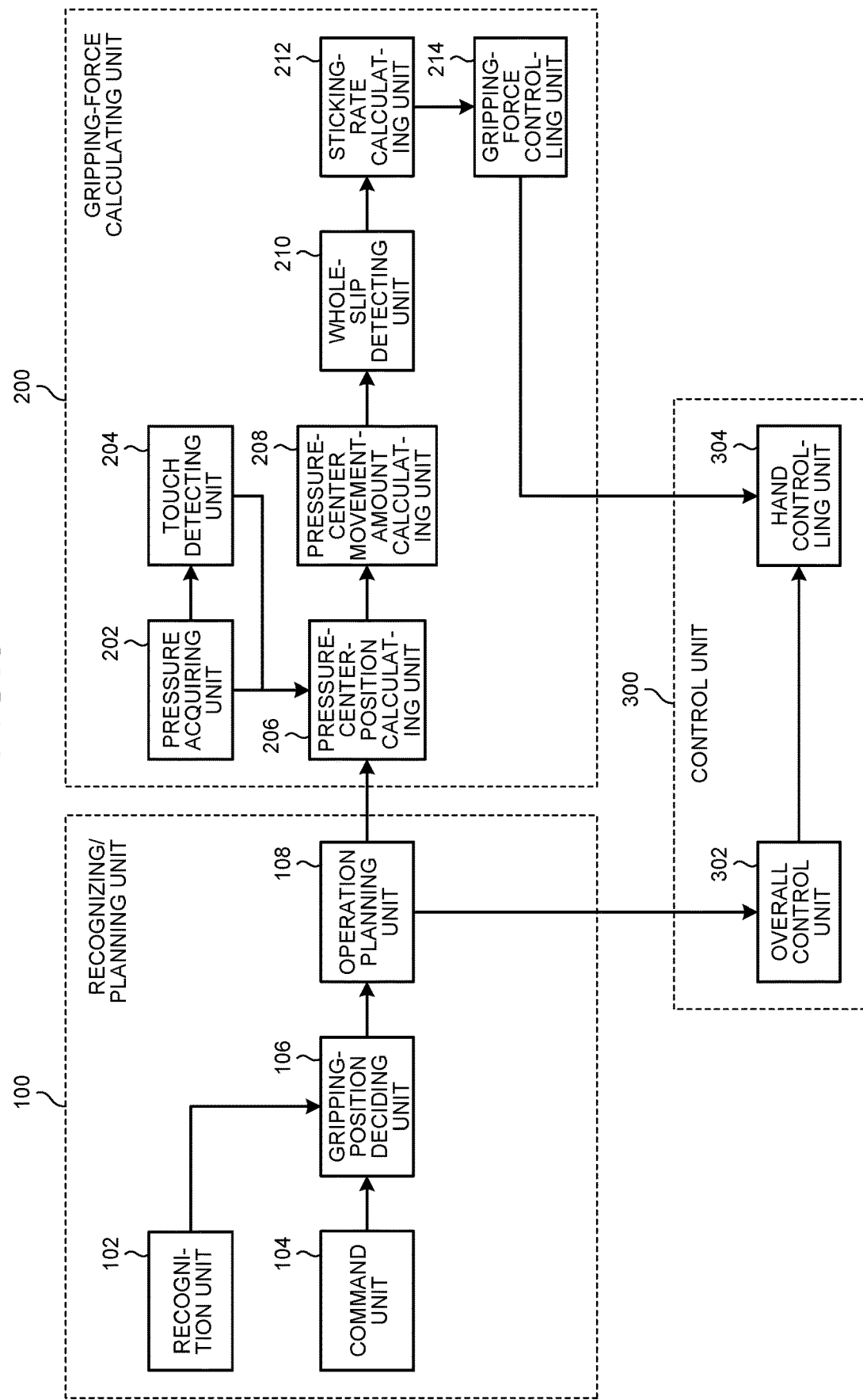

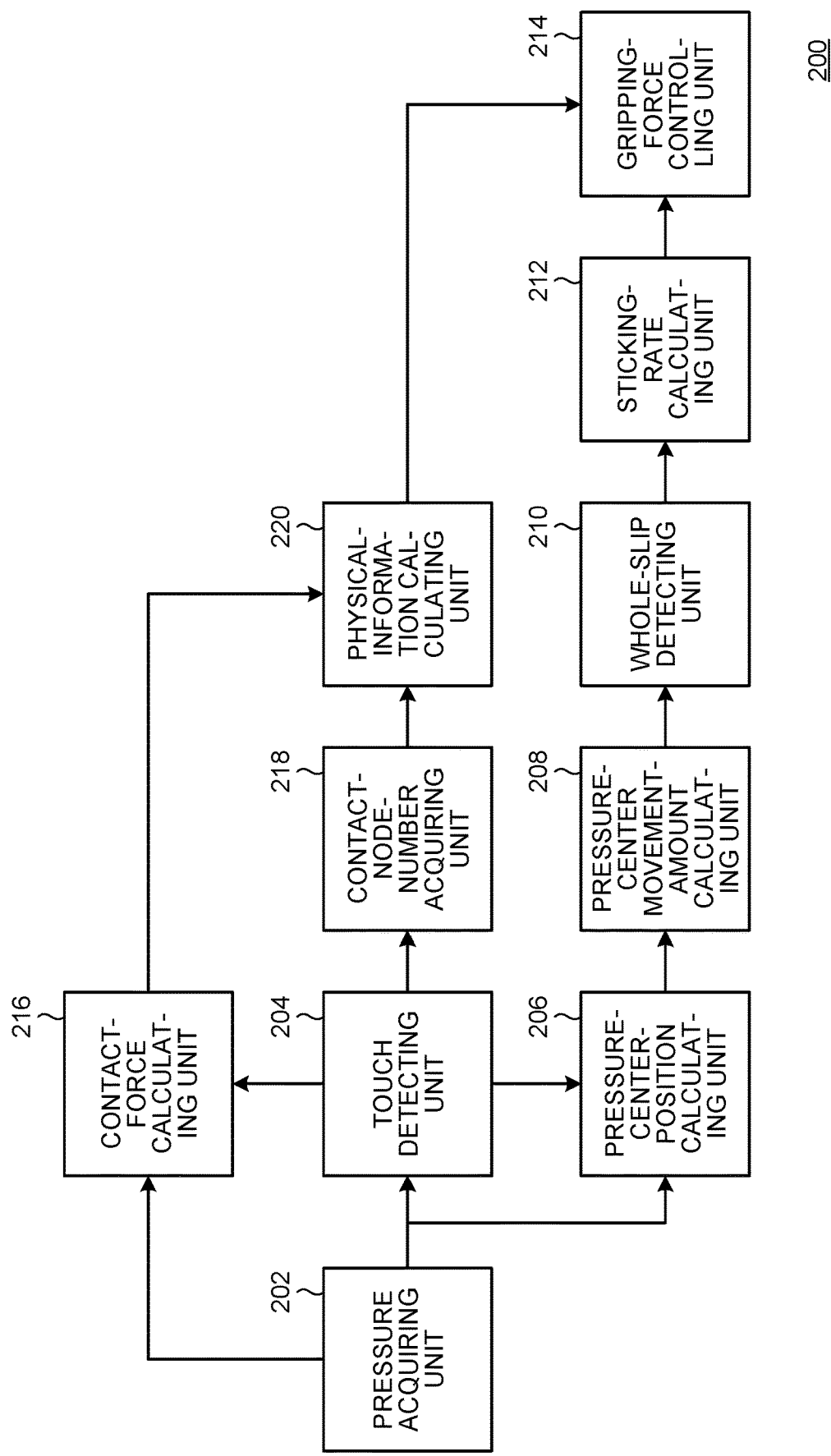

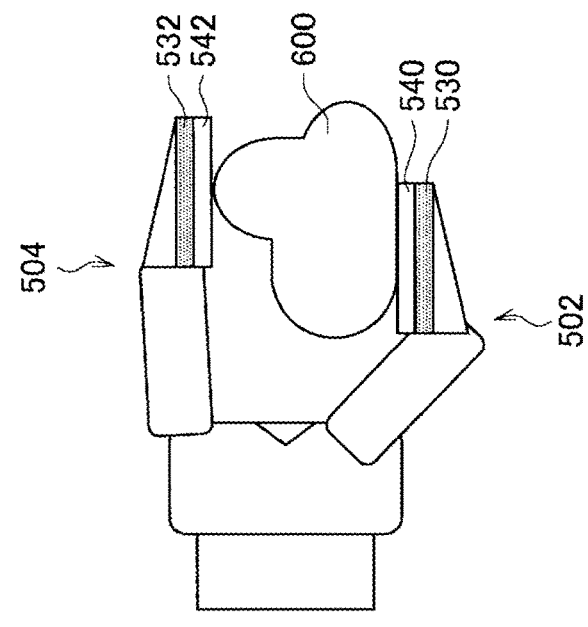
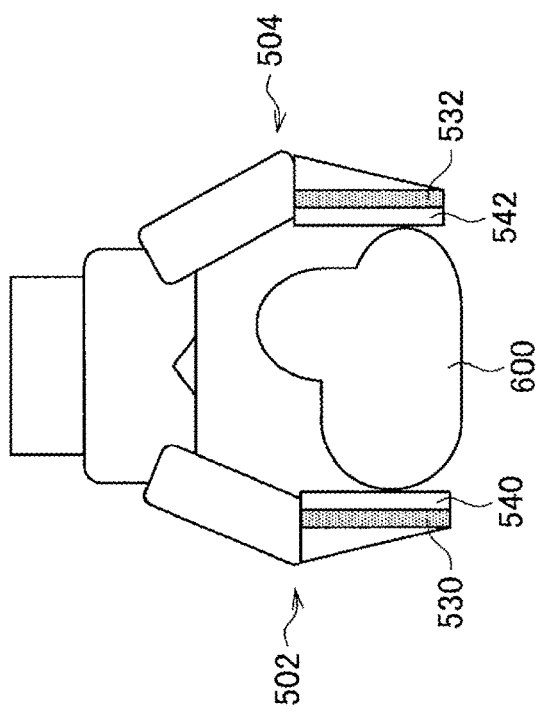
FIG.10

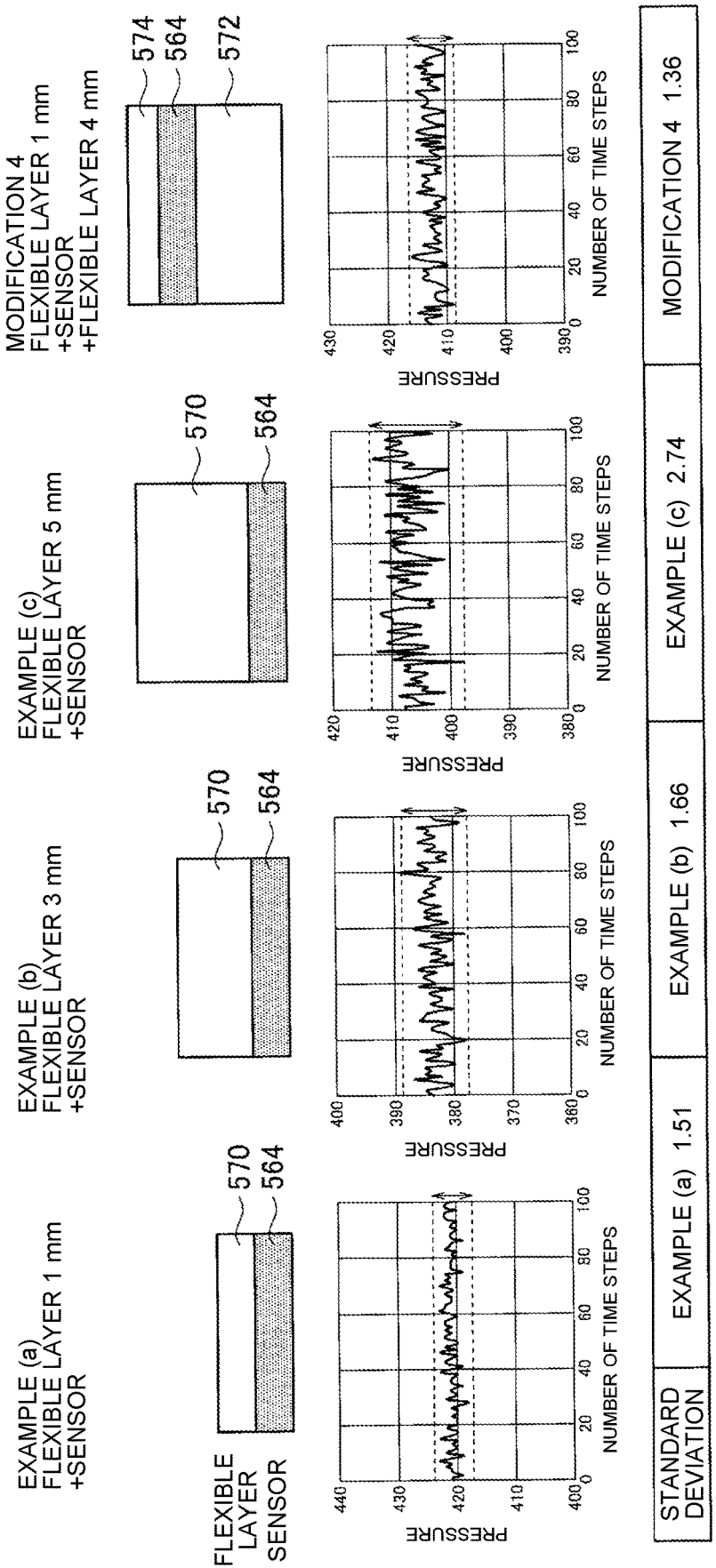

FIG.15B
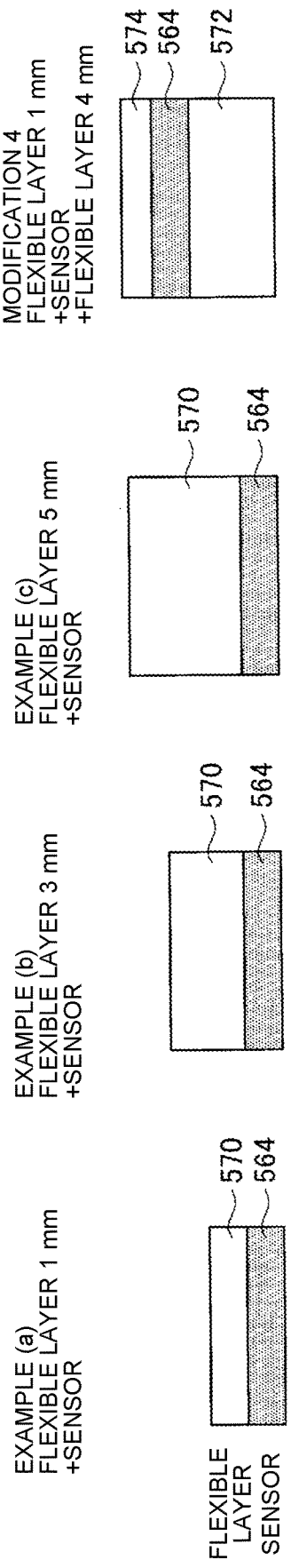
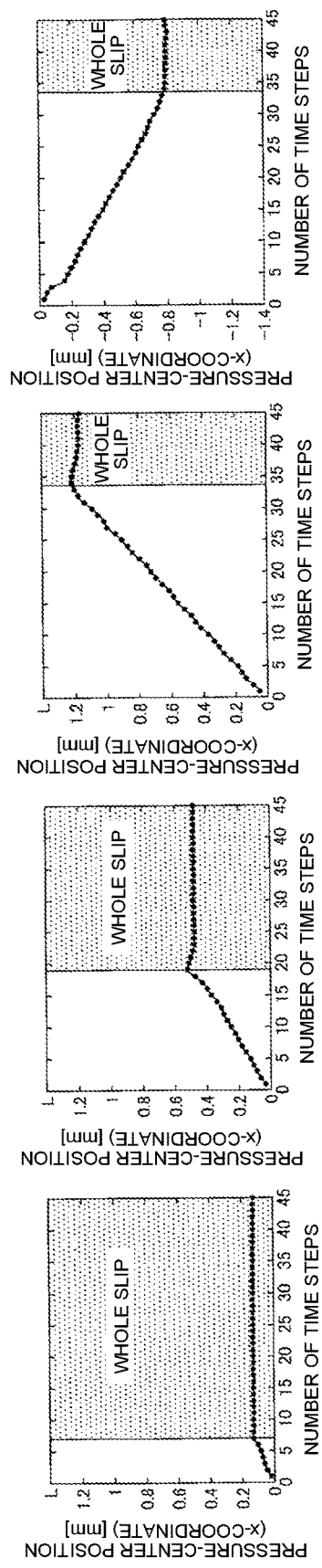

CONTROLLER, CONTROL METHOD, AND PROGRAM

CROSS REFERENCE TO PRIOR APPLICATION

This application is a National Stage Patent Application of PCT International Patent Application No. PCT/JP2019/022597 (filed on Jun. 6, 2019) under 35 U.S.C. § 371, which claims priority to Japanese Patent Application No. 2018-118928 (filed on Jun. 22, 2018), which are all hereby incorporated by reference in their entirety.

FIELD

The present disclosure relates to a controller, a control method, and a program.

BACKGROUND

Conventionally, the following Patent Literature 1 discloses that whether or not a slip has occurred on a contact surface is determined on the basis of (i) a change amount in a center position of the pressure against the contact surface and (ii) gripping force of a gripping unit that grips a target object body.

CITATION LIST

Patent Literature

Patent Literature 1: JP 2008-055540 A

SUMMARY

Technical Problem

Detection of a partial slip is effective in a case where a robot or the like grips an object. The partial slip is a phenomenon that occurs before a whole slip in which a relative position with respect to an object deviates and the object slips off, and in which a part of a contact surface starts to slip. In this case, in a state of the partial slip, a deviation of a relative position with respect to an object does not occur.

However, a technology disclosed in the above-mentioned Patent Literature 1 employs a method for detecting a whole slip when an object starts to slip, so that a gripping force is not able to be controlled unless the object starts to slip. Thus, in the technology disclosed in the above-mentioned Patent Literature 1, it is difficult to control a gripping force before an object starts to slip so as to perform a stable grip. Moreover, in the first place, the fact is that there presents no effective technology for detecting a partial slip. When a partial slip is to be detected, shear deformation of a contact part which occurs before a partial slip is detected, and thus it is difficult to decide the minimum gripping force on the basis of the partial slip. Moreover, in a case where pressure distribution is uniform, for example, when an object is hard or when an object surface is plane, progress of a partial slip is rapid, so that detection of the partial slip becomes difficult.

Thus, it has been desired to detect a slip of an object with high accuracy by detecting a partial slip.

Solution to Problem

According to the present disclosure, a controller is provided that includes: a whole-slip detecting unit that detects, based on pressure information sent from a plurality of regions having different slipping characteristics when an object in contact with the plurality of regions is slipping, a state of a whole slip in which the object is slipping on each of the plurality of regions.

Moreover, according to the present disclosure, a control method is provided that includes: based on pressure information sent from a plurality of regions having different slipping characteristics when an object in contact with the plurality of regions is slipping, detecting a state of a whole slip in which the object is slipping on each of the plurality of regions.

Moreover, according to the present disclosure, a program is provided that allows a computer to function as: a means for detecting, based on pressure information sent from a plurality of regions having different slipping characteristics when an object in contact with the plurality of regions is slipping, a state of a whole slip in which the object is slipping on each of the plurality of regions.

Advantageous Effects of Invention

As described above, according to the present disclosure, it is possible to detect a slip of an object with high accuracy by detecting a partial slip.

The above-described effects are not necessarily limited, and any effects indicated in the present specification or other effects that can be understood from the present specification may be exerted together with or instead of the above-described effects.

BRIEF DESCRIPTION OF DRAWINGS

FIG. 4 is a characteristic diagram illustrating, for comparison with FIG. 3B, a case where a friction coefficient of a first flexible layer and that of a second flexible layer are equalized to each other.

FIG. 6 is a diagram illustrating a configuration example of a control system of a robot according to one embodiment of the present disclosure.

FIG. 7 is a diagram illustrating a configuration of a gripping-force calculating unit according to a modification 1.

FIG. 10 is a diagram illustrating a specific control of the hand.

FIG. 15A is a diagram illustrating detection sensitivity by a distribution pressure sensor in accordance with difference in thickness of a flexible layer.

FIG. 15B is a characteristic diagram illustrating states of examples (a) to (c) and a modification 4 that are illustrated in FIG. 15A, in which a pressure-center position changes similarly to the case of FIG. 3B.

DESCRIPTION OF EMBODIMENTS

The following describes preferable embodiments of the present disclosure in detail with reference to the attached drawings. In the present specification and the drawings, overlap of descriptions will be avoided by providing the same reference symbols for constituent elements having substantially the same functional configuration.

Descriptions will be constituted in the following order.
1. Outline of Present Disclosure
2. Configuration of Hand
3. Slip of Object with respect to Flexible Layer
   3.1. "Whole slip" and "Partial Slip"
   3.2. Change in Contact State between Flexible Layer and Object
   3.3. Determination of Slip based on Pressure-Center Position
   3.4. Parameter that makes Occurrence Timing of Whole Slip different for each Flexible Layer
   3.5. Dividing Direction of Flexible Layer
4. Configuration Example of Control System of Robot
5. Modifications of Present Embodiment
   5.1. Modification 1 (Example for Adjusting Gripping-Force Controlling Gain in accordance with Rigidity of Object)
   5.2. Modification 2 (Example for Controlling Position and Posture of Finger in order to Increase Difference in Occurrence Timing of Whole Slip)
   5.3. Modification 3 (Variations of Arrangement of Flexible Layer and Distribution Pressure Sensor)
   5.4. Modification 4 (Example in which Flexible Layers are Arranged to interpose Distribution Pressure Sensor therebetween)
   5.5. Modification 5 (Method for Changing Friction Coefficient of Flexible Layer)
   5.6. Modification 6 (Example using Linear Flexible Layer)

1. Outline of Present Disclosure

For example, when a robot grips an object with a hand thereof, it is desirable that the object is gripped with a moderate force having an extent to which the object does not slip off from the hand. Thus, the object is able to be reliably gripped without breaking the object due to a gripping force. Particularly, when an object having the flexibility is gripped, breakage and deformation of the object is able to be reduced. The present disclosure relates to a technology that detects, in gripping an object, a state of "partial slip" before occurrence of a state of "whole slip" in which the object starts to slip, so as to grip the object with an appropriate gripping force.

2. Configuration of Hand

Figure 1:
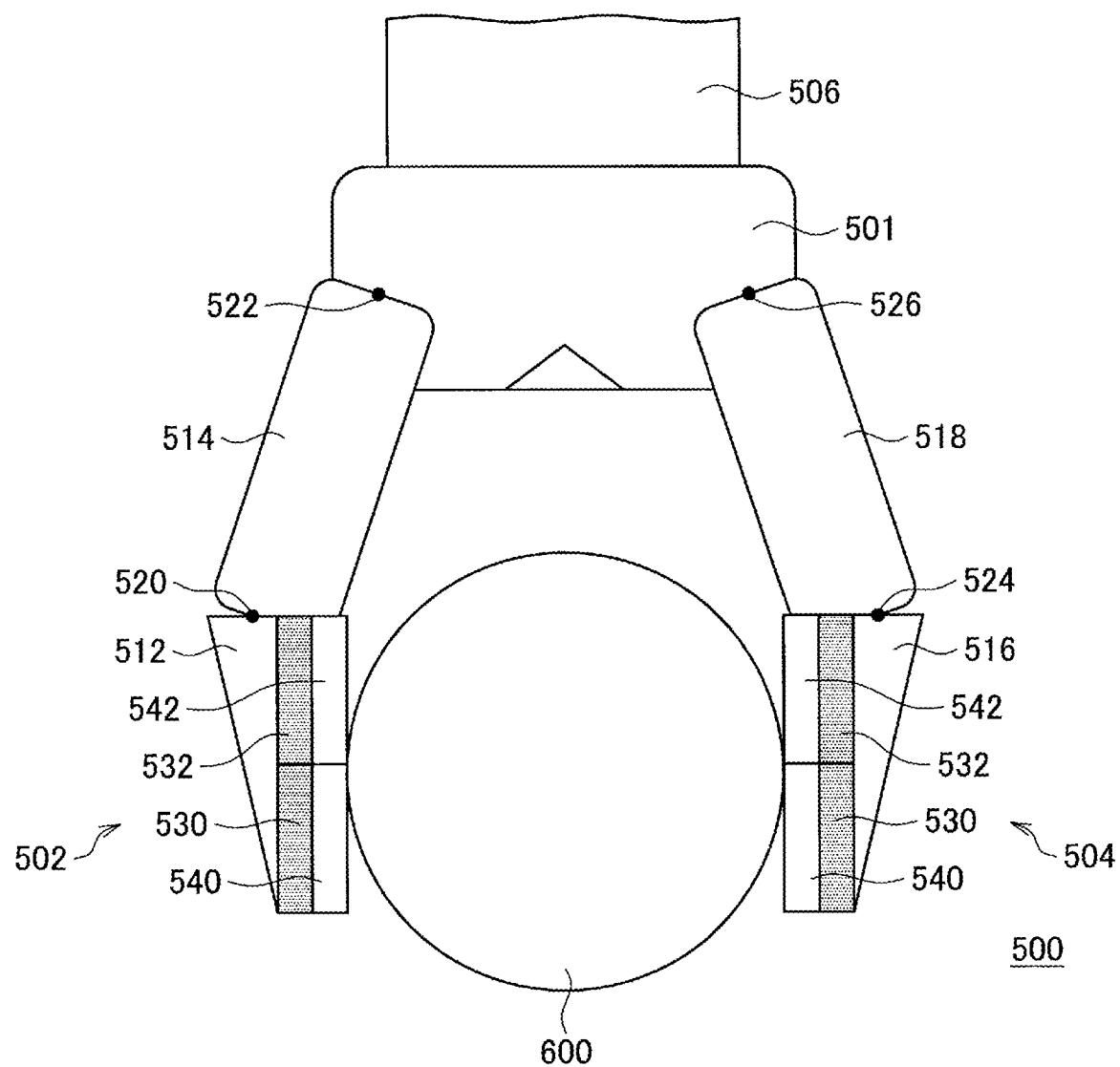
FIG. 1 is a diagram illustrating a configuration of a hand of a robot according to one embodiment of the present disclosure.

FIG. 1 is a diagram illustrating a configuration of a hand 500 of a robot according to one embodiment of the present disclosure. The hand 500 is arranged at a leading end of an arm 506 of a robot. As illustrated in FIG. 1, the hand 500 includes a body 501, a link 512 and a link 514 constituting a first finger 502, and a link 516 and a link 518 constituting a second finger 504. Joints 520, 522, 524, and 526 are provided with respective actuators. The link 512 is turned with respect to the link 514 by driving force of an actuator of the joint 520, and the link 514 is turned with respect to the body 501 by driving force of an actuator of the joint 522. Similarly, the link 516 is turned with respect to the link 518 by driving force of an actuator of the joint 524, and the link 518 is turned with respect to the body 501 by driving force of an actuator of the joint 526.

The arm 506 as one example includes multiple joints, and a plurality of links is turnably connected by the joints. Driving force of an actuator provided to each of the joints causes corresponding links to turn with respect to each other. Thus, the multiple-joint arm 506 is configured to have a predetermined degree of freedom, and further to be able to move the hand 500 to a desired position.

In FIG. 1, there is illustrated a state where the first finger 502 and the second finger 504 grip an object (target gripped object) 600. Distribution pressure sensors 530 and 532 are arranged inside (on object 600 side) of the link 512 of the first finger 502. A first flexible layer 540 is arranged inside of the distribution pressure sensor 530, and a second flexible layer 542 is arranged further inside of the distribution pressure sensor 532. Similarly, distribution pressure sensors 530 and 532 are arranged inside (on object 600 side) of the link 516 of the second finger 504. The first flexible layer 540 is arranged inside of the distribution pressure sensor 530, and the second flexible layer 542 is arranged inside of the distribution pressure sensor 532. The first flexible layer 540 and the second flexible layer 542 are made of an elastic material having one or both of the viscosity and the elasticity, are further made of a material that is easily deformed by a load applied from the outside, and made of material such as urethane gel and silicone gel. The first flexible layer 540 is made of a material whose friction coefficient is smaller than that of the second flexible layer 542. A slip detecting device according to the present embodiment is constituted of the first and the second flexible layers 540 and 542 and the distribution pressure sensors 530 and 532. The first and the second flexible layers 540 and 542 and the distribution pressure sensors 530 and 532 may be directly attached to the arm 506. The first and the second flexible layers 540 and 542 and the distribution pressure sensors 530 and 532 may be attached to a leg of a robot so as to detect a slip state between the leg and the ground (floor). As described above, the first and the second flexible layers 540 and 542 and the distribution pressure sensors 530 and 532 may be attached to a working part with which a robot works on an object.

Figure 2:
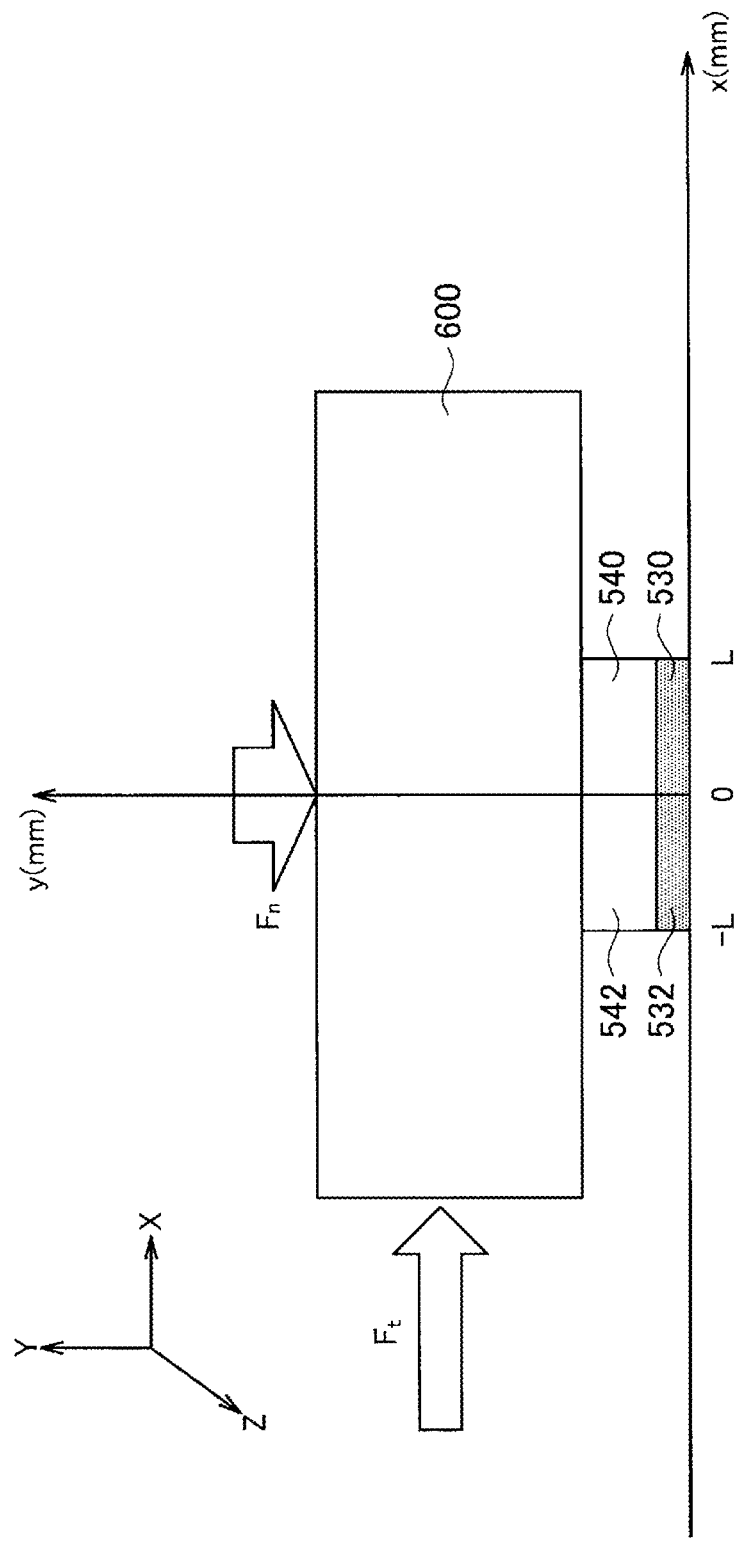
FIG. 2 is a diagram illustrating a state in which first and second flexible layers are in contact with an object.

FIG. 2 is a diagram illustrating a state in which the first and the second flexible layers 540 and 542 of the first finger 502 are in contact with the object 600. Note that the object 600 illustrated in FIG. 1 is spherical-shaped, on the other hand, the object 600 exemplified in FIG. 2 is rectangular parallelepiped-shaped. A direction of the x-axis illustrated in FIG. 2 is a direction (or direction in which object 600 is going to slip) in which the object 600 relatively slips with respect to the first and the second flexible layers 540 and 542. As illustrated in FIG. 2, the two flexible Layers 540 and 542 are arranged such that the second flexible layer 542 and the first flexible layer 540 are arranged in this order in a slipping direction of the object 600, and thus according to this arrangement, difference in an occurrence timing of a whole slip between the first flexible layer 540 and the second flexible layer 542 is able to be enlarged. In the example illustrated in FIG. 1, the x-axis direction corresponds to the gravity direction.

As illustrated in FIG. 2, a force Ft is applied to the object 600 in the x axis direction. When the x-axis direction is the gravity direction, the force Ft corresponds to the gravity. A force Fn is applied to the object 600 in the y-axis direction that is perpendicular to the x-axis direction. The force Fn corresponds to a reaction force when the object 600 is gripped by the first finger 502 and the second finger 504.

3. Slip of Object with Respect to Flexible Layer
3.1. "Whole Slip" and "Partial Slip"

As illustrated in FIG. 2, the force Ft is applied to the object 600 in the x-axis direction. In a case where the gravity direction is the x-axis direction, when a gripping force is weak with which the first finger 502 and the second finger 504 are gripping the object 600, the object 600 slips off in the gravity direction. Transition from a state where the object 600 is stopped to a state where the object 600 starts to slip is able to be explained by phenomenon of "whole slip" and "partial slip".

The "whole slip" is a state in which a relative position between the object 600 and the flexible layer deviates, and thus an object is slipping off. The "partial slip" is a phenomenon that occurs before the "whole slip" and in which a part of a contact surface between the object 600 and the flexible layers 540 and 542 is slipping. In the present embodiment, "partial slip" is detected in which the object 600 is gripped with the minimum force having an extent to which the object 600 does not slip off when the object 600 is gripped.

3.2. Change in Contact State Between Flexible Layer and Object

Figure 3A:
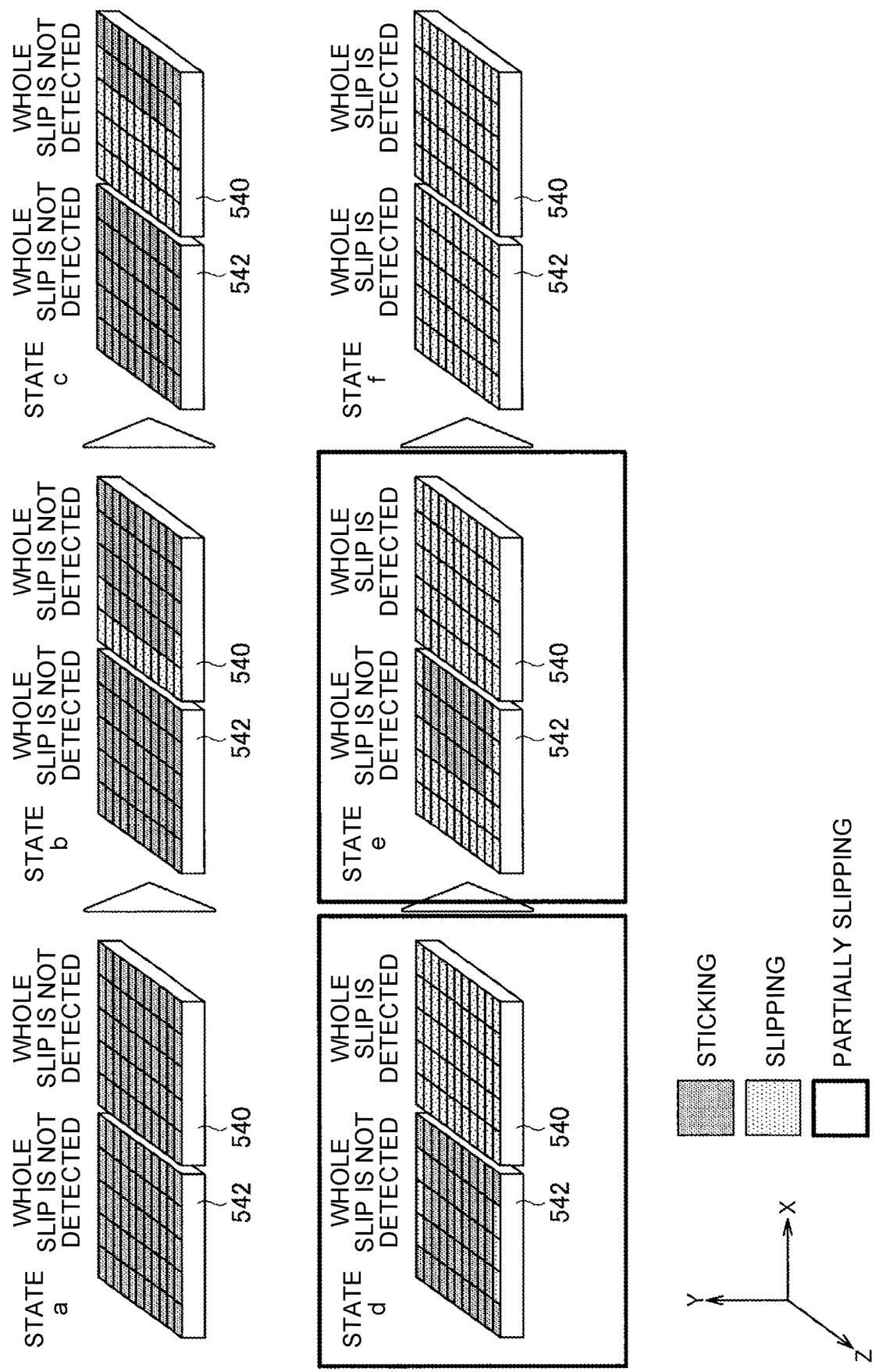
FIG. 3A is a diagram schematically illustrating chronological change in a contact state between a flexible layer and an object from a state a to a state f during a time interval from a time at which the object is gripped to a time at which the object starts to slip in a model illustrated in FIG. 2.

FIG. 3A is a diagram schematically illustrating chronological change in a contact state between the flexible layers 540 and 542 and the object 600 from a state a to a state f during a time interval from a time at which the object 600 is gripped to a time at which the object 600 starts to slip in a model illustrated in FIG. 2. In FIG. 3A, an upper surface of each of the flexible layers 540 and 542 is divided into a plurality of rectangular regions, and a contact state with the object 600 is classified into two of "sticking" and "slipping" by using two types of dots provided to the rectangular regions. In a rectangular region of "sticking", a slip does not occur between the object 600 and the flexible layers 540 and 542, and thus the object 600 and the flexible layers 540 and 542 stick to each other. On the other hand, in a rectangular region of "slipping", a slip has occurred between the object 600 and the flexible layers 540 and 542. The states of the rectangular regions may be obtained by analysis using simulation, for example. Hereinafter, on the basis of illustration of FIG. 3A, a state will be explained in which "partial slip" and "whole slip" occur during a time interval from a time at which the object 600 is gripped to a time at which the object 600 starts to slip.

A flexible layer arranged on the distribution pressure sensors 530 and 532 is divided into, for example, two parts of the first flexible layer 540 and the second flexible layer 542, and by the division, the first flexible layer 540 and the second flexible layer 542 are aligned in a slipping direction (x-axis direction) of the object 600. In the state a illustrated in FIG. 3A, all of the rectangular regions of upper surfaces of the first flexible layer 540 and the second flexible layer 542 are in a "sticking" state. Next, in the state b, rectangular regions in the upper surface of the first flexible layer 540 which are close to the second flexible layer 542 are changed into a "slipping" state. The other regions are in a "sticking" state.

Next, in the state c illustrated in FIG. 3A, in the upper surface of the first flexible layer 540, rectangular regions in a "slipping" state have enlarged. In the next state d, all of the rectangular regions in the upper surface of the first flexible layer 540 are changed into a "slipping" state, and a part of rectangular regions in the upper surface of the second flexible layer 542 is changed into a "slipping" state. In the next state e, in the upper surface of the second flexible layer 542, rectangular regions in a "slipping" state have enlarged. In the next state f, all of the rectangular regions in the upper surface of the second flexible layer 542 are changed into a "slipping" state.

When all of the rectangular regions in each of the first flexible layer 540 and the second flexible layer 542 are changed into a "slipping" state, a corresponding "whole slip" state appears. The first flexible layer 540 is turned into a "whole slip" state in the state d, and remains the "whole slip" state in the states e and f after the state d. On the other hand, the second flexible layer 542 is turned, later than the first flexible layer 540, into a "whole slip" state in the state f.

As described above, in each of the first flexible layer 540 and the second flexible layer 542, "slipping" regions are enlarged over time to turn into a "whole slip" state, and it is found that a timing at which the first flexible layer 540 having a low friction coefficient is turned into a "whole slip"

state is earlier. In other words, when friction coefficients of the two flexible layers 540 and 542 are different from each other, it is possible to generate difference in an occurrence timing of a whole slip.

In the state f where a whole slip simultaneously occurs in two regions of the first flexible layer 540 and the second flexible layer 542, a whole slip has occurred in all of the regions including the first flexible layer 540 and the second flexible layer 542. In the state, the object 600 relatively moves with respect to both of the first flexible layer 540 and the second flexible layer 542, and in FIG. 2, the object 600 is slipping in the x-axis direction.

In the present embodiment, the states d and e in each of which a whole slip occurs in a region of one of the first flexible layer 540 and the second flexible layer 542, and a whole slip does not occur in a region of the other are defined as a state where "partial slip" has occurred in all of the regions including the first flexible layer 540 and the second flexible layer 542. In the states d and e in which "partial slip" has occurred, the object 600 does not relatively move with respect to the first flexible layer 540 and the second flexible layer 542. In FIG. 3A, in order to indicate that the states d and e are in a "partial slip" state, the states d and e are surrounded by bold lines.

When focusing on a region of one of the first flexible layer 540 and the second flexible layer 542, it may be interpreted that in a region of the first flexible layer 540 under the states b and c, or in a region of the second flexible layer 542 under the states d and e, a partial slip has occurred. However, in the present embodiment, when all of the regions including the first flexible layer 540 and the second flexible layer 542 are focused on, the states d and e in which a whole slip has occurred in a region of one of the flexible layers 540 and 542 and a whole slip has not occurred in a region of the other are defined as a state where "partial slip" has occurred in all of the regions.

Each of the states a to c in which a whole slip has not occurred in the first flexible layer 540 or the second flexible layer 542 is a state in which all of the regions including the first flexible layer 540 and the second flexible layer 542 are sticking to the object 600.

Thus, each of the states d and e in which "partial slip" has occurred is a state just before the object 600 starts to slip, and the object 600 does not relatively move with respect, to the first flexible layer 540 and the second flexible layer 542. Thus, when a "partial slip" state is detected and an object is gripped with a gripping force having an extent to which a partial slip occurs, deformation and breakage of the object 600 is able to be reduced, and the object 600 is able to be gripped with an appropriate force with which the object 600 does not slip.

3.3. Determination of Slip Based on Pressure-Center Position

In the present embodiment, that "partial slip" or "whole slip" has occurred in all of the regions including the first flexible layer 540 and the second flexible layer 542 is determined on the basis of pressure-center positions obtained from the distribution pressure sensors 530 and 532.

Figure 3B:
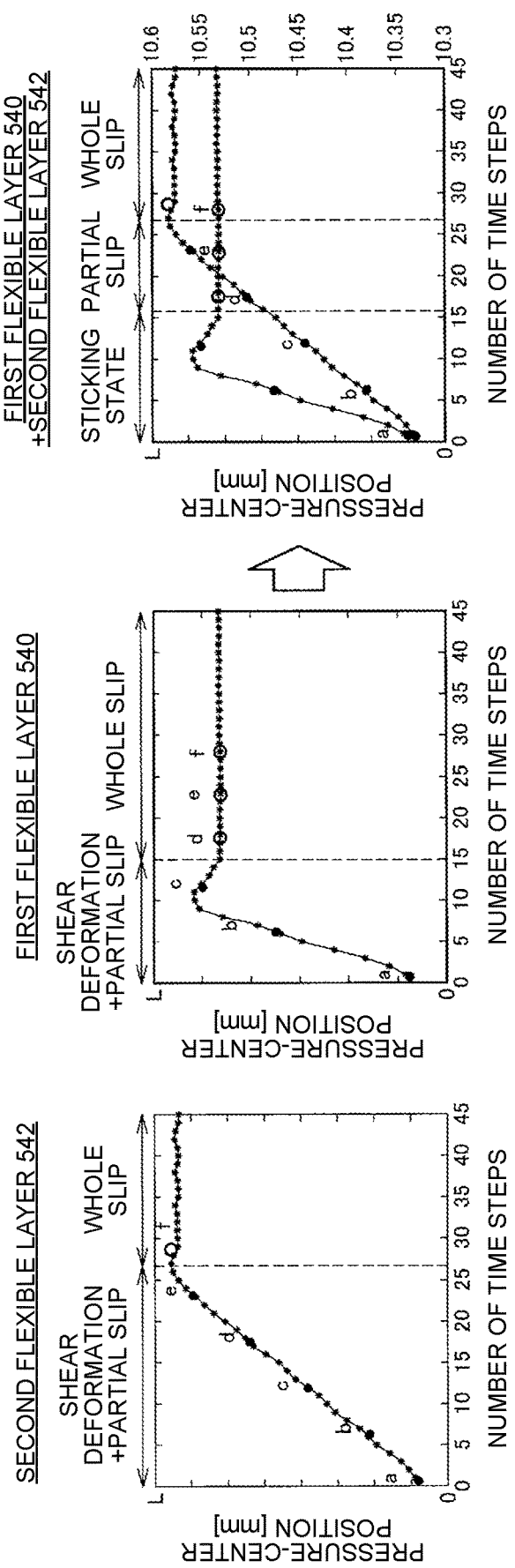
FIG. 3B is a characteristic diagram illustrating a state where a pressure-center position changes in each of regions of a first flexible layer and a second flexible layer in the states a to f illustrated in FIG. 3A.

FIG. 3B is a characteristic diagram illustrating a state where a pressure center position changes in each of regions of the first flexible layer 540 and the second flexible layer 542 in the states a to f illustrated in FIG. 3A. A pressure-center position $X_{cop}$ is obtained from the following formula (1). Each of the distribution pressure sensors 530 and 532 includes a plurality of nodes for detecting the pressure, which is arranged in a matrix. In the formula (1), N is the number of sensor nodes of each of the distribution pressure sensors 530 and 532, xi is a coordinate of an i-th node, and $p(x_i)$ is a pressure detected by the i-th node. The pressure-center position $X_{cop}$ is a value obtained by dividing, by a total of pressure values, a total of values that are obtained by multiplying the pressure values by coordinates, and is a value indicating the pressure center of each of the distribution pressure sensors 530 and 532.

$$X_{cop} = \frac{\sum_0^{N-1} \{p(x_i) \cdot x_i\}}{\sum_0^{N-1} p(x_i)} \quad (1)$$

In FIG. 3B, from the left, change in a pressure-center position of the second flexible layer 542, change in a pressure-center position of the first flexible layer 540, and change in the pressure-center positions of the first and the second flexible layers 540 and 542 are indicated in this order. In the three characteristic diagrams, a lateral axis is a number indicating the number of time steps, and a vertical axis indicates a pressure-center position. A pressure-center position of the vertical axis corresponds to a position in the x-axis direction illustrated in FIG. 2. In the characteristic of the first flexible layer 540, the origin of the vertical axis corresponds to the origin illustrated in FIG. 2, and in the characteristic of the second flexible layer 542, the origin of the vertical axis corresponds to a coordinate of -L illustrated in FIG. 2. Assume that a length in the x-axis direction of the first flexible layer 540 and that of the second flexible layer 542 are the same (=L).

In FIG. 3B, a to f provided to the characteristic of a pressure-center position respectively correspond to the states a to f illustrated in FIG. 3A.

As illustrated in FIG. 3B, as time passes, each of pressure-center positions of the first and the second flexible layers 540 and 542 moves in the x-axis direction illustrated in FIG. 2. In this case, a pressure-center position of the first flexible layer 540 having a lower friction coefficient moves faster than that of the second flexible layer 542. In the first flexible layer 540, at a time point when the number of time steps exceeds 15, movement of a pressure-center position stops to be turned into a steady state in which the pressure-center position is a constant value. On the other hand, in the second flexible layer 542, at a time point when the number of time steps exceeds 25, movement of a pressure-center position stops to be turned into a steady state in which the pressure-center position is a constant value.

As illustrated in FIG. 3B, a state where movement of a pressure-center position is stopped in each of the first flexible layer 540 and the second flexible layer 542 corresponds to a "whole slip" state. On the other hand, a state where movement of a pressure-center position is not stopped in each of the first flexible layer 540 and the second flexible layer 542 is a state where the corresponding pressure-center position is moving due to shear deformation and a partial slip of the first flexible layer 540 or the second flexible layer 542. In the state where movement of a pressure center position is not stopped, a relative movement does not occur between the object 600 and the first flexible layer 540 and the second flexible layer 542. On the other hand, in a state where movement of a pressure-center position is not stopped, in some cases, an absolute position of the object 600 is changed due to shear deformation of the first flexible layer 540 or the second flexible layer 542. As described above, when friction coefficients of the two flexible layers 540 and 542 are different from each other, it is possible to generate difference in an occurrence timing of a whole slip, as obvious from FIG. 3B, an occurrence timing at which a whole slip of the second flexible layer 542 is later than that of the first flexible layer 540.

The characteristic diagram illustrated on the right side of FIG. 3B is a characteristic diagram obtained by overlapping the characteristic diagram illustrated on the left side of FIG. 3B and the characteristic diagram illustrated in the center of FIG. 3B. In the present embodiment, on the basis of change in a pressure-center position, a state where a whole slip has occurred in the first flexible layer 540 in which a whole slip occurs earlier and a whole slip has not occurred in the second flexible layer 542 is determined to be a state where "partial slip" has occurred in a whole region including the first flexible layer 540 and the second flexible layer 542. Furthermore, on the basis of change in a pressure-center position, a state where a whole slip has occurred in both of the first flexible layer 540 and the second flexible layer 542 is determined to be a state where "whole slip" has occurred in a whole region including the first flexible layer 540 and the second flexible layer 542. Furthermore, on the basis of change in a pressure-center position, a state where a whole slip has not occurred in both of the first flexible layer 540 and the second flexible layer 542 is determined to be a sticking state.

As described above, when a pressure-center position is calculated in a region of each of the first flexible layer 540 and the second flexible layer 542, a whole slip in the corresponding region is able to be detected. In the above-mentioned example, the number of regions is two, and thus when a whole slip simultaneously occurs in the two regions, the state is determined that a whole slip has occurred in a whole region including the first flexible layer 540 and the second flexible layer 542 (state f). When a whole slip has occurred in one of the regions, the state is determined that a partial slip has occurred in a whole region (states d and e). When a whole slip has not occurred in any of the regions, the state is determined that a whole region is in a "sticking state" (states a, b, and c).

Assume that a rate of a non-detection region of "whole slip" with respect to a whole region (contact region of target object 600) including the first flexible layer 540 and the second flexible layer 542 is a sticking rate. In FIG. 3B, in the state f, with respect to a whole region including the first flexible layer 540 and the second flexible layer 542, both of a region of the first flexible layer 540 and a region of the second flexible layer 542 are in a state of a whole slip, and thus a sticking rate is 0%. In the states d and e, with respect to a whole region including the first flexible Layer 540 and the second flexible layer 542, a region of the first flexible layer 540 is in a state of a whole slip, and thus a sticking rate is 50%. In the states a, b, and c, with respect to a whole region including the first flexible layer 540 and the second flexible layer 542, none of a region of the first flexible layer 540 and a region of the second flexible layer 542 are in a state of a whole slip, and thus a sticking rate is 100%.

In the present embodiment, a gripping force by the hand 500 is controlled in accordance with a sticking rate. As a sticking rate is larger, a gripping force by the hand 500 is more reduced, and as a sticking rate is smaller, a gripping force by the hand 500 is more increased. Thus, the object 600 is able to be gripped with the bare minimum force, so that it is possible to prevent breakage and deformation of the object 600.

As the number of division in a region of the flexible layer is larger, the resolution of a sticking rate is larger, and further the accuracy of gripping force control is higher. Moreover, as the number of division in a region of the flexible layer is larger, with respect to a smaller object and an object having concavity and convexity, a sticking rate is able to be detected. For example, in a case where the number of division in the flexible layer is three, when a sticking rate is obtained by a method similar to the above-mentioned one, a sticking rate is able to be calculated with four steps of 0%, 33%, 66%, and 100%.

For example, in a case where the number of division in the flexible layer is three and a friction coefficient of each of the divided flexible layers are different from each other, when a whole slip has occurred in all of the flexible layers, a sticking rate is 0%. When a whole slip has occurred in a region of a flexible layer whose friction coefficient is the smallest and a region of a flexible layer whose friction coefficient is the second smallest, and a whole slip has not occurred in a region of a flexible layer whose friction coefficient is the largest, a sticking rate is 33%. When a whole slip has occurred in a region of a flexible layer whose friction coefficient is the smallest, and a whole slip has not occurred in a region of a flexible layer whose friction coefficient is the second smallest and a region of a flexible layer whose friction coefficient is the largest, a sticking rate is 66%. Furthermore, when a whole slip has occurred in all of the regions of the flexible layers, a sticking rate is 0%. From a similar viewpoint, as the number of division in a region of a flexible layer is more increased, a state of a partial slip is able to be detected with a higher accuracy.

FIG. 4 is a characteristic diagram illustrating, for comparison with FIG. 3B, a case where a friction coefficient of the first flexible layer 540 and that of the second flexible layer 542 are equalized to each other. Conditions other than a friction coefficient and an indicating method of characteristic diagrams are similar to those illustrated in FIG. 3R. As illustrated in FIG. 4, when a friction coefficient of the first flexible layer 540 and that of the second flexible layer 542 are the same to each other, there presents no difference in an occurrence timing of a whole slip between a region of the first flexible layer 540 and a region of the second flexible layer 542, and thus it is difficult to detect a partial slip in a whole region including the first flexible layer 540 and the second flexible layer 542. Thus, a state according to the present embodiment illustrated in FIG. 3B where a sticking rate is 50%, in other words, a state where "partial slip" has occurred in a whole region including the first flexible layer 540 and the second flexible layer 542 is not able to be detected. According to the present embodiment, a state where "partial slip" has occurred is able to be detected in a whole region including the first flexible layer 540 and the second flexible layer 542, and thus a gripping force is able to be controlled with high accuracy on the basis of a sticking rate corresponding to a state of a partial slip.

Thus, when friction coefficients of the first flexible layer 540 and the second flexible layer 542 are different from each other, it is possible to generate difference in an occurrence timing of a whole slip between the first flexible layer 540 and the second flexible layer 542, so that it is possible to detect a partial slip in a whole region including the first and the second flexible layers 540 and 542. As difference in an occurrence timing of a whole slip between the first flexible layer 540 and the second flexible layer 542 is larger, a time interval during which a partial slip occurs in a whole region including the first and the second flexible layers 540 and 542 is longer, so that it is possible to easily control a gripping force.

3.4. Parameter that Makes Occurrence Timing of Whole Slip Different for Each Flexible Layer In the above explanation, friction coefficients are made different from each other between the first flexible layer 540 and the second flexible layer 542 so as to make an occurrence timing of a whole slip different between the first flexible layer 540 and the second flexible layer 542. On the other hand, parameters other than the friction coefficients may be made different from each other between the first flexible layer 540 and the second flexible layer 542, so as to make an occurrence timing of a whole slip different between the first flexible layer 540 and the second flexible layer 542. As parameters other than a friction coefficient, the Young's modulus, the Poisson ratio, thickness, a curvature radius, and the like may be exemplified.

In a case of a friction coefficient, as a friction coefficient is smaller, an occurrence timing of a whole slip is earlier. In a case of the Young's modulus, as the Young's modulus is larger, an occurrence timing of a whole slip is earlier. In a case of the Poisson ratio, as the Poisson ratio is smaller, an occurrence timing of a whole slip is earlier. In a case of the thickness, as the thickness is smaller, an occurrence timing of a whole slip is earlier. In a case of a curvature radius, as a curvature radius is larger, an occurrence timing of a whole slip is earlier.

In the above-mentioned parameters, when conditions both of whose occurrence timings of a whole slip are early, or conditions both of whose occurrence timings of a whole slip are late are combined with each other, it is possible to further increase difference in an occurrence timing of a whole slip. For example, when a first flexible layer whose friction coefficient is small and thickness is small and a second flexible layer whose friction coefficient is large and thickness is large are provided, it is possible to further increase difference in an occurrence timing of a whole slip between the first flexible layer and the second flexible layer.

3.5. Dividing Direction of Flexible Layer

Figure 5A:
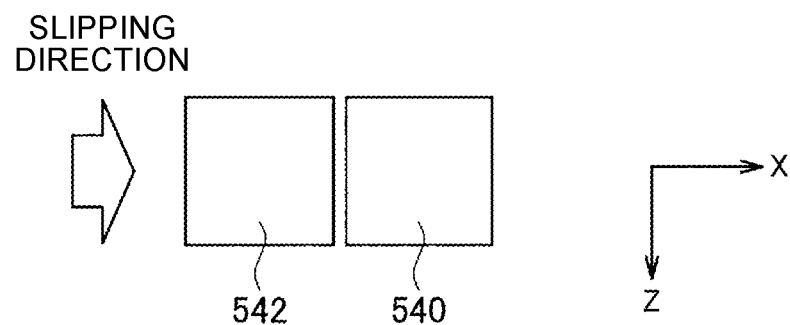
FIG. 5A is a diagram illustrating a dividing direction of the flexible layer.
Figure 5B:
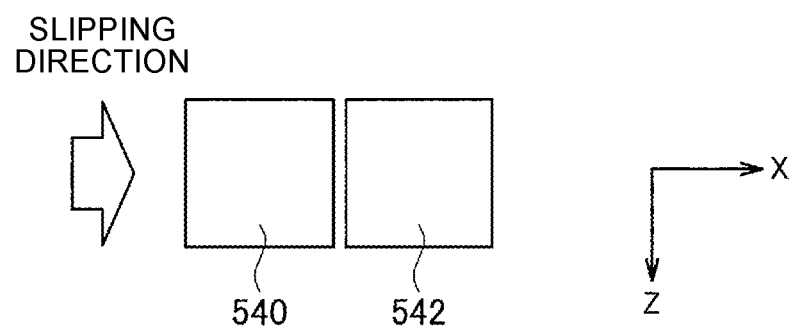
FIG. 5B is a diagram illustrating a dividing direction of the flexible layer.
Figure 5C:
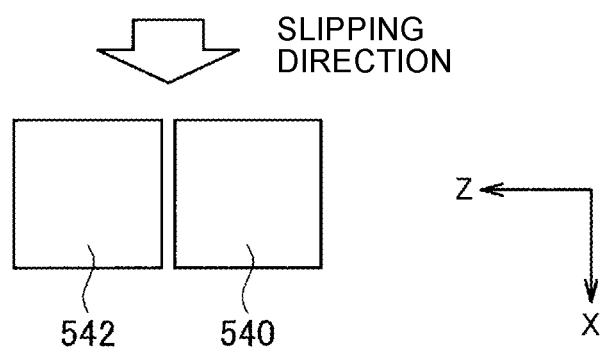
FIG. 5C is a diagram illustrating a dividing direction of the flexible layer.

FIGS. 5A to 5C are diagrams illustrating dividing directions of the flexible layer. Similarly to FIGS. 1 and 2, in FIGS. 5A and 5B, examples are illustrated in which the first flexible layer 540 and the second flexible layer 542 are divided into two parts in a slipping direction. In FIG. 5C, an example is illustrated in which the first flexible layer 540 and the second flexible layer 542 are divided into two parts in a direction perpendicular to the slipping direction.

When a vertical axis (z-axis illustrated in FIGS. 5A to 5C) of the object 600 to be gripped is restricted with respect to a slipping direction of the object 600, there presents no difference in an occurrence timing of a complete slip between the first flexible layer 540 and the second flexible layer 542. On the other hand, when the vertical axis is not restricted, an axial rotation is slightly generated due to friction distribution, and thus difference in an occurrence timing of a complete slip is larger when the first flexible layer 540 and the second flexible layer 542 are vertically divided with respect to a slipping direction. In an actual environment, there presents no situation in which an axis of an object is restricted, and thus a case is more preferable in which the first flexible layer 540 and the second flexible layer 542 are divided with respect to a slipping direction, as illustrated in FIGS. 5A and 5B. Moreover, a case illustrated in FIG. 5A in which the second flexible layer 542 and the first flexible layer 540 are arranged in this 2.4 order with respect to a slipping direction of the object 600 has a larger difference in an occurrence timing of a whole slip than a case illustrated in FIG. 5B in which the first flexible layer 540 and the second flexible layer 542 are arranged in this order with respect to a slipping direction of the object 600. In other words, when the second flexible layer 542 having a larger friction coefficient is arranged on an upper flow side of a slipping direction, difference in an occurrence timing of a whole slip between the first flexible layer 540 and the second flexible layer 542 is able to be larger. In a case of arrangement illustrated in FIG. 5B, a slipping force of the first flexible layer 540 positioned on an upper flow side of a slipping direction is stopped by the second flexible layer 542 positioned on a lower flow side, and thus an occurrence timing of a whole slip in the first flexible layer 540 becomes comparatively late. Thus, in a case of arrangement illustrated in FIG. 5B, difference in an occurrence timing of a whole slip between the first flexible layer 540 and the second flexible layer 542 becomes comparatively small. On the other hand, in a case of arrangement illustrated in FIG. 5A, a slipping force of the second flexible layer 542 positioned on an upper flow side of a slipping direction is not stopped by the first flexible layer 540 positioned on a lower flow side, and thus a whole slip occurs at a comparatively early timing in the first flexible layer 540 positioned on a lower flow side. Thus, in a case of arrangement illustrated in FIG. 5A, difference in an occurrence timing of a whole slip is able to be larger.

The plurality of flexible layers may be arranged to be adjacent to each other. For example, as illustrated in FIG. 10 to be mentioned later, the first flexible layer 540 and the second flexible layer 542 may be separately and respectively arranged in different fingers of the hand 500.

4. Configuration Example of Control System of Robot

FIG. 6 is a diagram illustrating a configuration example of a control system (controller) 1000 of a robot according to one embodiment of the present disclosure. As illustrated in FIG. 6, the control system 1000 is configured to include a recognizing/planning unit 100, a gripping-force calculating unit 200, and a control unit 300. The recognizing/planning unit 100 includes a recognition unit 102, a command unit 104, a gripping-position deciding unit 106, and an operation planning unit 108. The gripping-force calculating unit 200 includes a pressure acquiring unit 202, a touch detecting unit 204, a pressure-center-position calculating unit 206, a pressure-center movement-amount calculating unit 208, a whole-slip detecting unit 210, a sticking-rate calculating unit 212, and a gripping-force control ling unit 214. The control unit 300 includes an overall control unit 302 and a hand controlling unit 304.

The recognizing/planning unit 100 recognizes the object 600 to be gripped by a robot, and creates a plan for gripping the object 600. The recognition unit 102 is constituted of a camera, a Time of Flight (ToF) sensor, etc. so as to recognize a three-dimensional shape of the object 600. A command from a user is input to the command unit 104. The gripping-position deciding unit 106 decides, by using recognition result of a target object by the recognition unit 102, a position of a robot for gripping the object 600 on the basis of a command of a user which is input to the command unit 104. On the basis of a gripping position decided by the gripping-position deciding unit 106, the operation planning unit 108 creates a plan of operation of the arm 506 and operation of the hand 500 arranged at a leading end of the arm 506 of the robot.

The gripping-force calculating unit 200 calculates a gripping force of the hand 500 for gripping the object 600 so as to control the gripping force. The pressure acquiring unit 202 acquires a pressure detected by the distribution pressure sensors 530 and 532. The touch detecting unit 204 detects, by using a distribution pressure value acquired by the pressure acquiring unit 202, contact between the first and the second flexible layers 540 and 542 and the object 600. For example, when a distribution pressure value is equal to or more than a predetermined value, the touch detecting unit 204 detects contact between the first and the second flexible layers 540 and 542 and the object 600. The pressure-center-position calculating unit 206 calculates, by using a distribution pressure value acquired by the pressure acquiring unit 202, a pressure-center position $X_{cop}$ in accordance with the above mentioned formula (1) in a region of each of the first and the second flexible layers 540 and 542.

The pressure-center movement-amount calculating unit 208 calculates, by using a pressure-center position calculated by the pressure-center-position calculating unit 206, a movement amount of a pressure-center position in a region of each of the first, and the second flexible layers 540 and 542. The pressure-center movement-amount calculating unit 208 calculates a movement amount $\Delta X_{cop}$ of a pressure-center position by the following formula (2). The right side of the formula (2) indicates a difference between the pressure-center position $X_{cop}$ at a time point t+1 and the pressure-center position $X_{cop}$ at a time point t.

$$\Delta X_{cop} = X_{cop_{t+1}} - X_{cop_t} \quad (2)$$

The whole-slip detecting unit 210 detects, by using a movement amount of a pressure-center position calculated by the pressure-center movement-amount calculating unit 208, whether or not there presents a change in movement of a pressure-center position during a preliminary-set time window. The time window is a predetermined time interval that has been preliminary set. When there presents no movement, of a pressure-center position during the predetermined time interval, the whole-slip detecting unit 210 detects that the pressure-center position is not changed and a whole slip has occurred. The whole-slip detecting unit 210 monitors change in a pressure-center position for each of the regions of the two distribution pressure sensors 530 and 532, so as to detect occurrence of a whole slip in each of the regions.

The sticking-rate calculating unit 212 calculates a rate of a non-detection region of a whole slip with respect to a whole region including the first flexible layer 540 and the second flexible layer 542, and employs the calculated rate as a sticking rate. As described above, when the flexible layer is divided into two parts, the sticking rate is calculated as three-type values of 0%, 50%, and 100%.

The gripping-force controlling unit 214 decides a gripping force such that a sticking rate is a constant value. The gripping-force controlling unit 214 controls, by feedback control, a gripping force such that a sticking rate calculated by the sticking-rate calculating unit 212 is a predetermined value. As one example, the gripping-force controlling unit 214 controls a gripping force such that a sticking rate is 50%.

The control unit 300 controls operation of a robot. On the basis of an operation plan created by the operation planning unit 108, the overall control unit 302 controls the arm 506 of the robot. On the basis of control of the gripping-force controlling unit 214, the hand controlling unit 304 controls the hand 500. Note that the gripping-force controlling unit. 214 and the hand controlling unit 304 may be integrated with each other.

Each of the configuration elements of the recognizing/planning unit 100, the gripping-force calculating unit 200, and the control unit 300 of the control system 1000 illustrated in FIG. 6 may be constituted of a circuit (hardware) or a center calculation processing device such as a Central Processing Unit (CPU) and a program (software) that causes the CPU to function. The program may be stored in a memory provided to the control system 1000, or a recording medium, such as a memory, which is connected to the control system 1000 from the outside thereof. The same may be applied to FIGS. 7, 9, and 20 to be mentioned later.

5. Modifications of Present Embodiment

Hereinafter, a few modifications of the present embodiment will be explained.

5.1. Modification 1 (Example for Adjusting Gripping-Force Controlling Gain in accordance with Rigidity of Object)

In a modification 1, physical information (rigidity) on the object 600 is calculated from a position of the hand 500 at a moment when the object 600 is in contact with a flexible layer and then the flexible layer is pressed against the object 600, or information on a contact area and a contact force between the flexible layer and the object 600. A gripping-force controlling gain is adjusted on the basis of the physical information on the object 600. The gripping-force controlling gain is an increase rate when a gripping force is increased such that a sticking rate is a constant value.

FIG. 7 is a diagram illustrating a configuration of the gripping-force calculating unit 200 according to the modification 1. As illustrated in FIG. 7, the gripping-force calculating unit 200 according to the modification 1 includes, in addition to the configuration illustrated in FIG. 6, a contact-force calculating unit 216, a contact-node-number acquiring unit (contact-radius calculating unit) 218, and a physical-information calculating unit 220.

The contact-force calculating unit 216 calculates a contact force when the object 600 is in contact with the first and the second flexible layers 540 and 542. The contact force is obtained by multiplying the number of contact nodes of all of the nodes of the distribution pressure sensors 530 and 532 by a force (pressure) applied to each of the contact nodes. The contact node is a node of the distribution pressure sensors 530 and 532 which is in contact with the object 600 via the first flexible layer 540 or the second flexible layer 542. In other words, the contact node is a node from which a detection value (detection value is not zero) of the pressure is obtained.

On the basis of contact between the first and the second flexible layers 540 and 542 and the object 600 which is detected by the touch detecting unit 204, the contact-node-number acquiring unit 218 acquires a contact node number. The contact node number corresponds to a contact area. From information on a contact area acquired from the contact-node-number acquiring unit 218 and information on a contact force acquired from the contact-force calculating unit 216, the physical-information calculating unit 220 calculates rigidity as physical information on the object 600.

From a contact radius a when the object 600 is in contact with a flexible layer, the rigidity is able to be calculated as physical information on the object 600. In this case, a contact-radius calculating unit is caused to function instead of the contact-node-number acquiring unit 218. From the Hertz contact theory, the contact radius a between a robot finger (first finger 502 or second finger 504) and an object is able to be indicated by the following formula (3).

$$a = \left(\frac{3 F_n r}{4 E^*}\right)^{\frac{1}{2}} \quad (3)$$

Note that r is a radius of a robot finger, and $E^*$ is an effective elastic modulus. As indicated in the following formula (4), the of effective elastic modulus $E^*$ is obtained by elastic moduli Ef and Eo and respective Poisson ratios vf and vo of the robot finger and the object.

$$E^* = \left(\frac{1-v_f^2}{E_f} + \frac{1-v_o^3}{E_o}\right)^{-1} \quad (4)$$

The Poisson ratio is a value that is not more than approximately 0.5 and is commonly a smaller value, and thus the Poisson ratio is able to be neglected as indicated in a formula (5) by assuming that a value of the square of the Poisson ratio does not largely affect E*.

$$E^* \sim \left(\frac{1}{E_f} + \frac{1}{E_o}\right)^{-1} \quad (4)$$

A radius r of a robot finger and the Young's modulus Ef of the robot finger are already known, and thus on the basis of the contact radius a calculated by the contact-radius calculating unit 218 and information on a contact force Fn, physical information (Young's modulus Eo) on the object 600 is able to be calculated by the formula (3).

The rigidity as physical information on the object 600 is transmitted to the gripping-force controlling unit 214. The gripping-force controlling unit 214 adjusts a gripping-force controlling gain on the basis of the physical information. As described above, a gripping-force controlling gain is an increase rate when a gripping force is increased such that a sticking rate is a predetermined constant value. When the rigidity of the object 600 is high, probability that deformation or breakage occurs in the object 600 is comparatively low, and thus the gripping-force controlling unit 214 sets an increase rate of a gripping force to be high when controlling a sticking rate such that the sticking rate is a target value. On the other hand, when the rigidity of the object 600 is low, probability that deformation or breakage occurs in the object 600 is comparatively high, and thus the gripping-force controlling unit 214 sets an increase rate of a gripping force to be low when controlling a sticking rate such that the sticking rate is a target value.

According to the modification 1, the above-mentioned state of a partial slip is detected, a gripping force is able to be controlled with the bare minimum force having an extent to which the object 600 does not slip, and further an increase rate of a quipping force is able to be controlled in accordance with the hardness of the object 600. Thus, it is possible to reliably reduce deformation and breakage of the object 600 in gripping.

When obtaining a rigidity of the object 600, the rigidity may be obtained by relation between a position (pressed amount) of the hand 500 and a contact force obtained from the distribution pressure sensors 530 and 532 when a flexible layer is pressed against the object 600.

5.2. Modification 2 (Example for Controlling Position and Posture of Finger in order to Increase Difference in Occurrence Timing of Whole Slip)

Figure 8A:
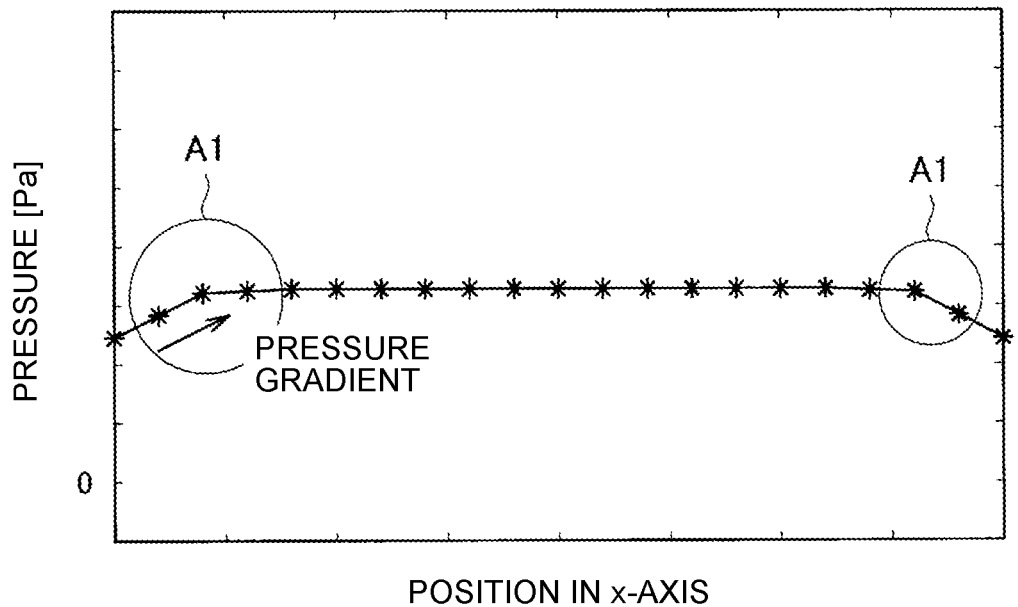
FIG. 8A is a characteristic diagram illustrating an example of pressure distribution when the flexible layer is in contact with an object.
Figure 8B:
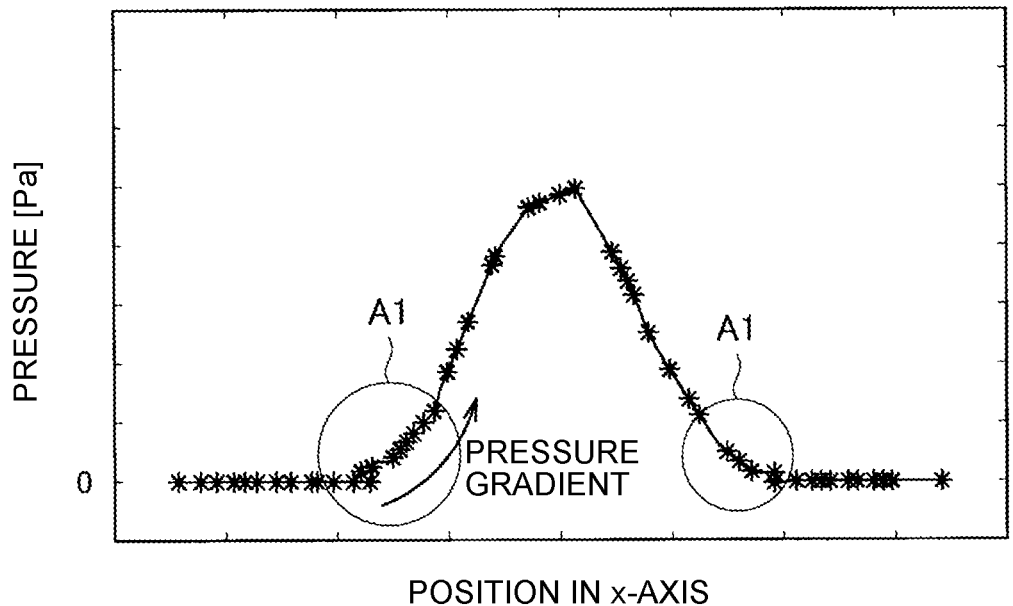
FIG. 8B is a characteristic diagram illustrating an example of pressure distribution when the flexible layer is in contact with the object.
Figure 8C:
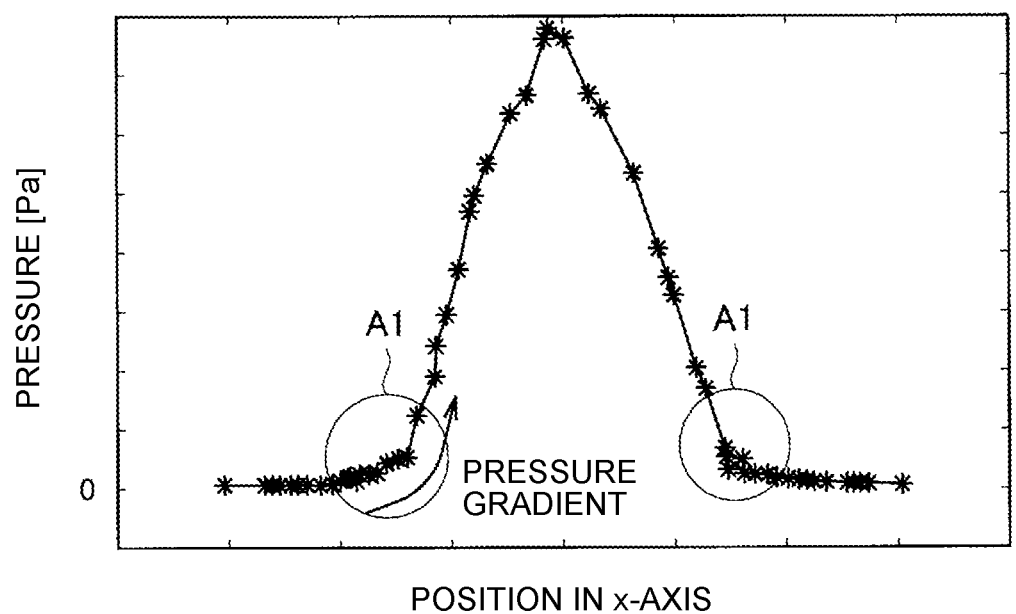
FIG. 8C is a characteristic diagram illustrating an example of pressure distribution when the flexible layer is in contact with the object.

In a modification 2, a position and a posture of a finger are controlled in order to increase difference in an occurrence timing of a whole slip between the first flexible layer 540 and the second flexible layer 542. Herein, as pressure distribution is steeper when the flexible layers 540 and 542 are in contact with the object 600, an occurrence timing of a whole slip is later. FIGS. 8A to 8C are characteristic diagrams illustrating examples of pressure distribution when the flexible layers 540 and 542 are in contact with the object 600. FIG. 8C, FIG. 8B, and FIG. 8A are aligned in the decreasing order of steepness of a pressure distribution. That a pressure distribution is steep means that a pressure gradient is large in an end part of a region (region A1 illustrated in FIGS. 8A to 8C) in which the flexible layers 540 and 542 and the object 600 are in contact with each other.

In FIGS. 8A to 8C, a region in which the pressure is high is a region in which the flexible layers 540 and 542 are in contact with the object 600. In an end part of a region in which the flexible, layers 540 and 542 and the object 600 are in contact with each other, a gradient is generated in the pressure. As the pressure gradient is larger, an occurrence timing cf a whole slip is later.

For example, in a region in which the flexible layers 540 and 542 and the object 600 are in contact with each other, a shape of the object 600 has a convex surface, and as a curvature radius of the convex surface is smaller, a pressure gradient is steeper and an occurrence timing of a whole slip is later.

In the modification 2, the hand 500 is controlled such that the first flexible layer 540 and the second flexible layer 542 are arranged in respective positions having different pressure gradients for each of the first flexible layer 540 and the second flexible layer 542.

Figure 9:
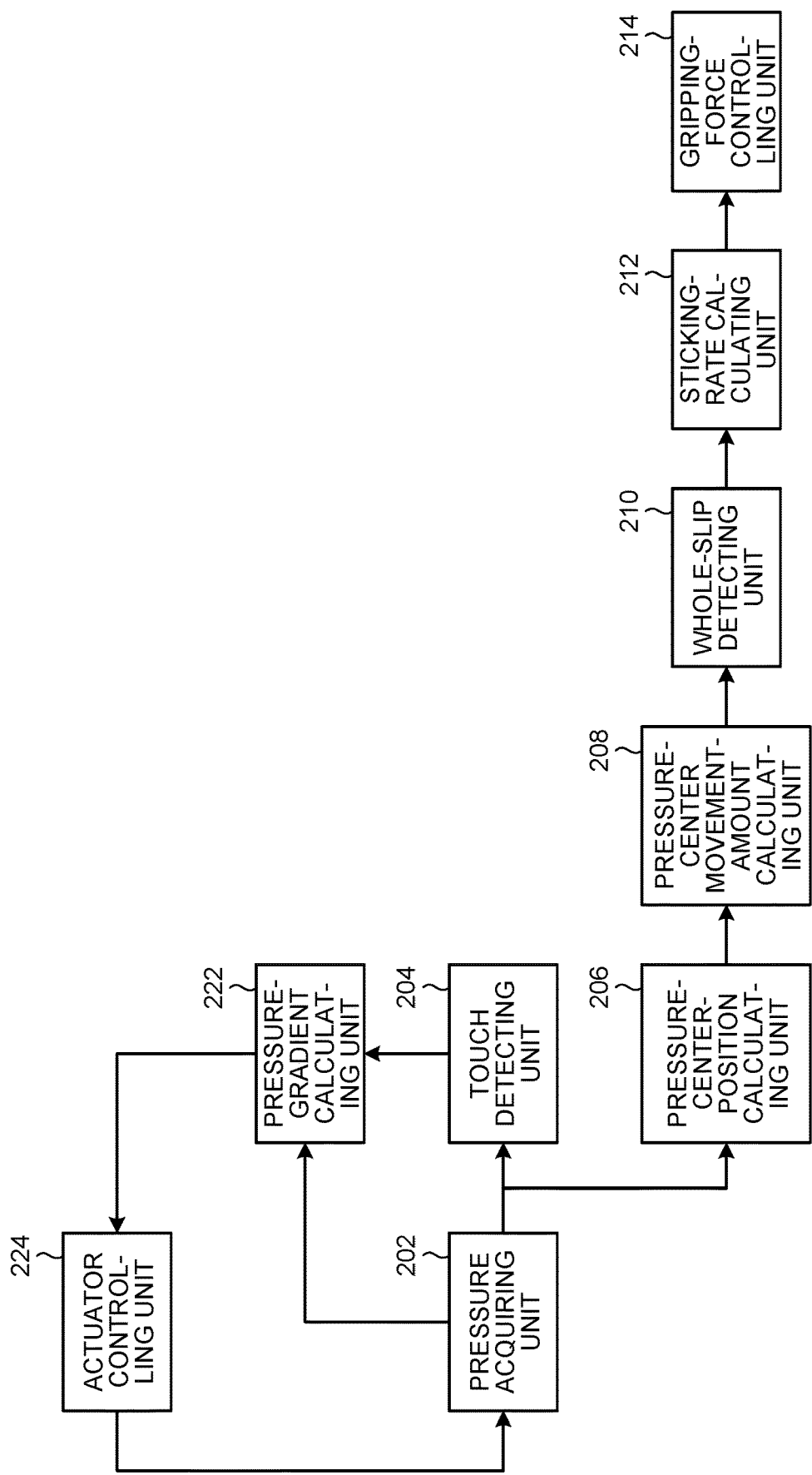
FIG. 9 is a diagram illustrating a configuration of a gripping-force calculating unit according to a modification 2.

FIG. 9 is a diagram illustrating a configuration of the gripping-force calculating unit 200 according to the modification 2. As illustrated in FIG. 9, the gripping-force calculating unit 200 according to the modification 2 includes a pressure-gradient calculating unit 222 and an actuator controlling unit 224 in addition to the configuration illustrated in FIG. 6.

When contact between the first and the second flexible layers 540 and 542 and the object 600 is detected by the touch detecting unit 204, the pressure-gradient calculating unit 222 acquires the features illustrated in FIGS. 8A to 8C on the basis of pressures detected by the distribution pressure sensors 530 and 532. The pressure-gradient calculating unit 222 calculates a pressure gradient of the region A1 illustrated in FIGS. 8A to 8C. Note that pressures detected by the distribution pressure sensors 530 and 532 are acquired by the pressure acquiring unit 202, and are transmitted to the pressure-gradient calculating unit 222.

On the basis of a pressure gradient calculated by the pressure-gradient calculating unit 222, the actuator controlling unit 224 controls an actuator that controls the hand 500 or the arm 506. The actuator controlling unit 224 controls the actuator such that the object 600 is gripped at a position where difference in a pressure gradient is larger in a contact part between the first flexible layer 540 and the second flexible layer 542 and the object 600.

FIG. 10 is a diagram illustrating a specific control of the hand 500. In FIG. 10, a state before a position and a posture of a finger are controlled in accordance with pressure gradient is illustrated in a left part, and a state after a position and a posture of a finger are controlled in accordance with pressure gradient is illustrated in a right part. In FIG. 10, the first flexible layer 540 and the distribution pressure sensor 530 are provided to the first finger 502, and the second flexible layer 542 and the distribution pressure sensor 532 are provided to the second finger 504. Thus, in FIG. 10, an example is illustrated in which the first flexible layer 540 and the second flexible layer 542 are not divided in a slipping direction of the object 600.

Before a position and a posture of a finger are controlled, a contact surface of the object 600 is a curved surface for each of the first flexible layer 540 and the second flexible layer 542. Or the other hand, after a position and a posture of a finger are controlled, a contact surface of the object. 600 is a curved surface for the second flexible layer 542; however, a contact surface of the object 600 is a plane for the first flexible layer 540.

As described above, a friction coefficient of the first flexible layer 540 is smaller than a friction coefficient of the second flexible layer 542, and thus an occurrence timing of a whole slip of the second flexible layer 542 is later. Addition-ally, after a position and a posture of a finger is controlled, a contact surface of the object 600 is a plane for the first flexible layer 540, and a contact surface of the object. 600 is a curved surface for the second flexible layer 542. Thus, a pressure distribution in the second flexible layer 542 is steeper than a pressure distribution of the first flexible layer 540, and thus an occurrence timing of a whole slip in the second flexible layer 542 is further later. Thus, difference in an occurrence timing of a whole slip is able to be larger between the first flexible layer 540 and the second flexible layer 542.

In the above-mentioned example, the example is indicated in which a position and a posture of a finger of the hand 500 is controlled in accordance with pressure gradient; however, a position and a posture of a finger of the hand 500 may be controlled on the basis of three-dimensional information on the object 600 which is obtained by observing a shape of the object 600 by using the recognition unit 102. In thin case, on the basis of the three-dimensional information, the first flexible layer 540 may be caused to be in contact with a part having a small pressure gradient and the second flexible layer 542 may be caused to be in contact with a part having a large pressure gradient.

5.3. Modification 3 (Variations of Arrangement of Flexible Layer and Distribution Pressure Sensor)

As described above, it is more preferable that the first flexible layer 540 and the second flexible layer 542 are divided in a slipping direction of the object 600. In a modification 3, when a plurality of slipping directions of the object 600 is supposed in accordance with a posture of the hand 500 and/or the arm 506, division is executed which does not depend on a slipping direction.

Figure 11:
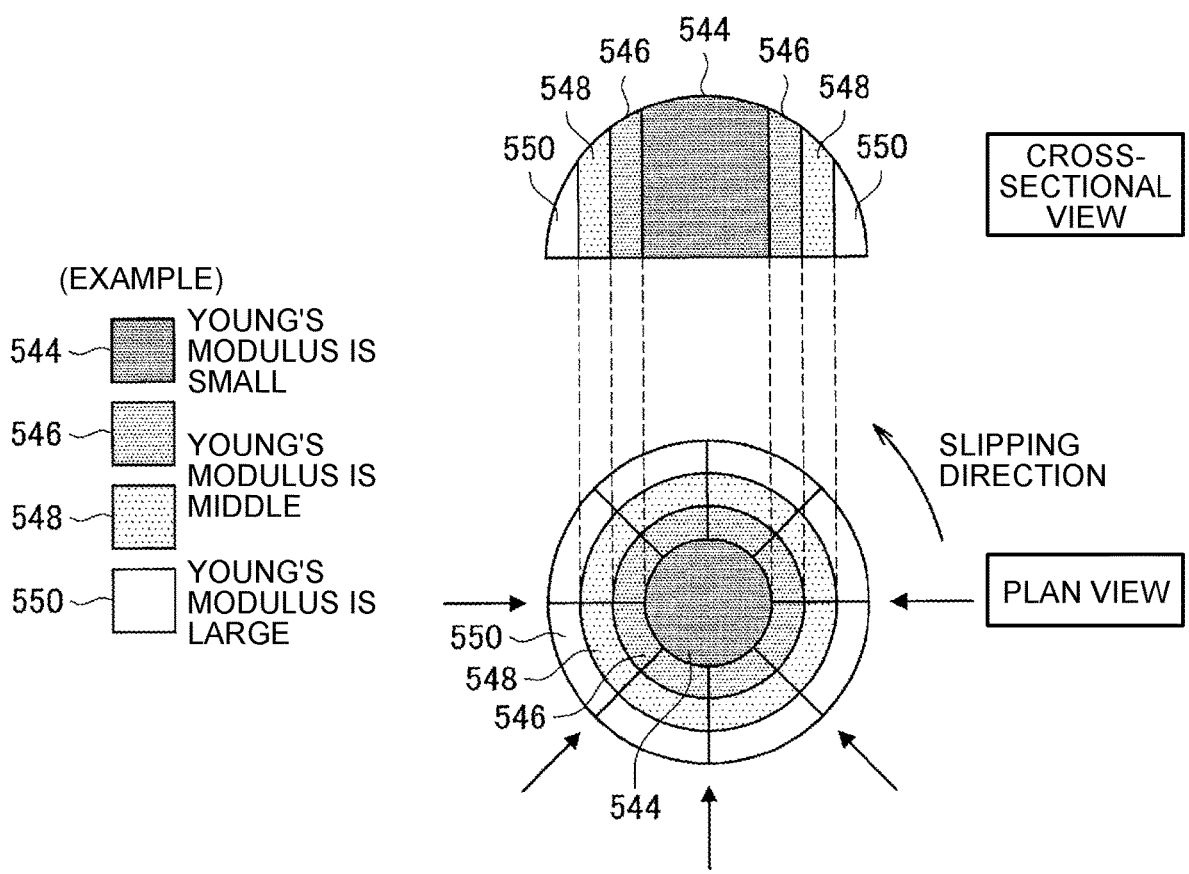
FIG. 11 is a diagram illustrating a division example of a flexible layer.

FIG. 11 is a diagram illustrating a division example of a flexible layer. In the example illustrated in FIG. 11, the Young's modulus is different for each of a plurality of flexible layers 544, 546, 548, and 550. The flexible layers 544, 546, 548, and 550 are divided by circular boundaries, and the closer to the center, the smaller the Young's modulus is. According to such a division method, it is possible to correspond to slips in multiple directions which are indicated in FIG. 11 by using a plurality of arrows, and for each of the slipping directions, a flexible layer is divided in a corresponding slipping direction.

As described above, in a parameter that makes an occurrence timing of a whole slip different for each flexible layer, when conditions whose occurrence timings of a whole slip are early, or conditions whose occurrence timings of a whole slip are late are combined with each other, it is possible to further increase difference in an occurrence timing of a whole slip.

Thus, in the example illustrated in FIG. 11, a condition of thickness and a condition of the Young's modulus are combined, and thicknesses of the flexible layers 544, 546, 548, and 560 and the Young's modulus are set such that the closer to the center a flexible layer is, the larger a thickness thereof is and further the smaller the Young's modulus thereof is. Hence, the larger the Young's modulus is, the earlier an occurrence timing of a whole slip is, and the smaller a thickness is, the earlier an occurrence timing of a whole slip is, and thus in FIG. 11, the closer to a periphery a flexible layer is, the earlier an occurrence timing of a whole slip is and the closer to the center of a flexible layer is, the later an occurrence timing of a whole slip is.

Regarding parameters for making an occurrence timing of a whole slip different, thickness and the Young's modulus are combined, and the peripheral flexible layer 550 whose Young's modulus is large is used for the heavy object 600 that requires a large gripping force, on the other hand, the center flexible layer 544 alone whose Young's modulus is small is used for gripping the light and fragile object 600 that does not require a large gripping force. Thus, it is possible to use an appropriate flexible layer in accordance with an object to layer gripped.

Figure 12:
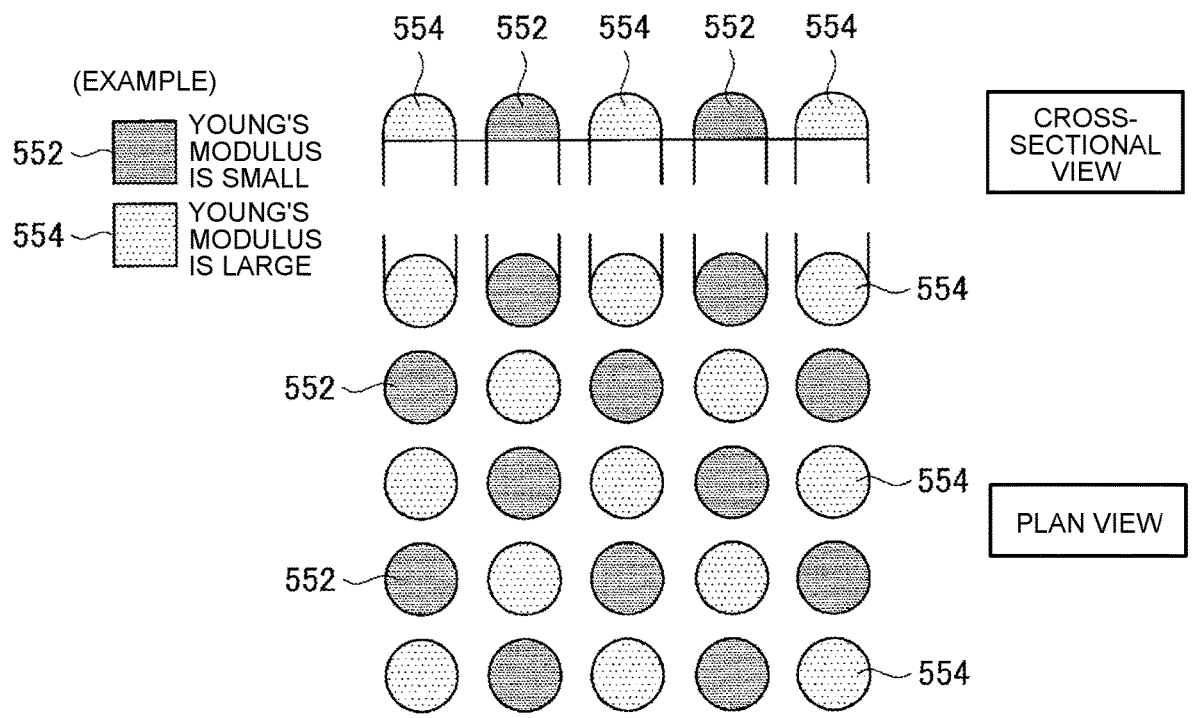
FIG. 12 is a plan view illustrating a division example that does not depend on a position in contact with an object.

FIG. 12 is a plan view illustrating a division example that does not depend on a position in contact with the object 600. In the example illustrated in FIG. 12, a flexible layer 552 whose Young's modulus is small and a flexible layer 554 whose Young's modulus is large are used. As illustrated in the plan view, the flexible layers 552 and the flexible layers 554 are alternately zigzag arranged. In FIG. 12, the flexible layers 552 and 554 having different two respective Young's moduli are illustrated; however, flexible layers having different three respective Young's moduli may be arranged. In this case, when flexible layers are arranged such that in FIG. 12, Young's moduli of flexible layers that are adjacent to each other in a row direction and in a column direction are different from each other, zigzag arrangement is obtained even when flexible layers having three or more different Young's moduli are arranged. When the flexible layers 552 and 554 having two different respective Young's moduli are arranged, in FIG. 12, flexible layers may be arranged such that Young's moduli of the flexible layers on the same row or the same column are the same and the Young's moduli are different for each row or column.

As described above, the larger the number of division in a region is, the resolution of a sticking rate increases, so that the accuracy of gripping force control is improved. The larger the number of division in a region is, detection of a sticking rate is able to be executed with respect to a smaller object and an object having concavity and convexity. However, the number of division depends on a pitch width between nodes of a distribution pressure sensor, and when the number of division is to be more increased, there presents a limit in terms of hardware. Thus, as illustrated in FIG. 13, in order to artificially reduce a pitch width between nodes of two distribution pressure sensors 560 and 562, the distribution pressure sensors 560 and 562 are laminated in a displaced manner.

Figure 13:
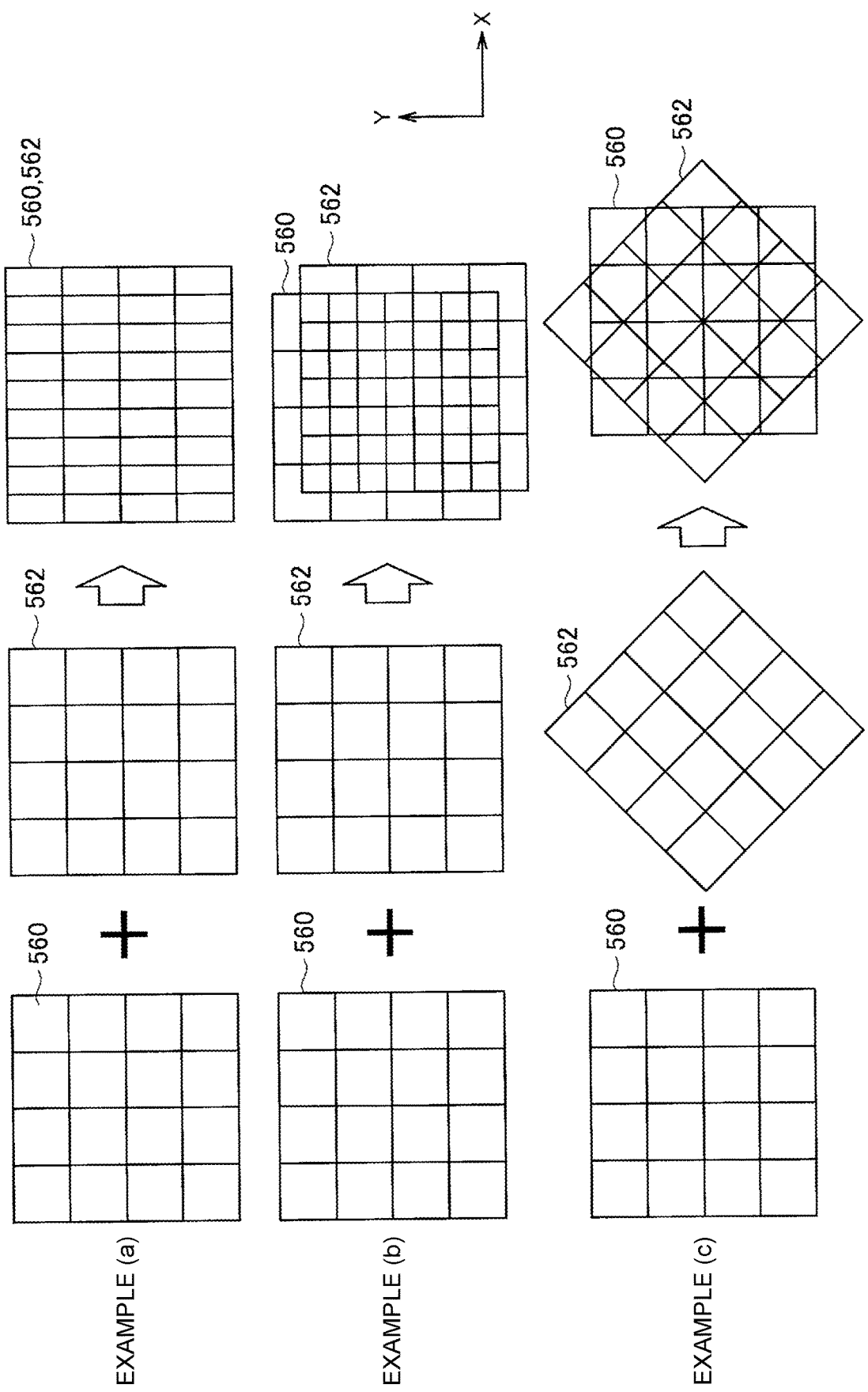
FIG. 13 is a diagram illustrating an example in which distribution pressure sensors are displaced from each other and are arranged into a layer in order to artificially reduce a pitch width between nodes of the two distribution pressure sensors.

In the example illustrated in FIG. 13, from the top, there are illustrated three methods of a case (example (a)) where the two distribution pressure sensors 560 and 562 are displaced to each other in an alignment direction (x-axis direction) of nodes, a case (example (b)) where the two distribution pressure sensors 560 and 562 are displaced to each other in alignment directions (x-axis direction and y-axis direction) of nodes, and a case (example (c)) where the distribution pressure sensor 562, which is one of the two distribution pressure sensors, is rotated by 45° and overlapped with the other of the two distribution pressure sensors.

In the example (a) illustrated in FIG. 13, the distribution pressure sensors 60 and 562 are arranged by displacing them to each other in the x-axis direction by ½ width of a node. In the example (b) illustrated in FIG. 13, the distribution pressure sensors 560 and 562 are arranged by displacing them to each other in the x-axis direction and the y-axis direction by ½ width of a node. The arrangement and the overlapping method of the distribution pressure sensors are not limited to the examples illustrated in FIG. 13.

As described above, when the distribution pressure sensors 560 and 562 are arranged by displacing them to each other, it is possible to artificially reduce a pitch width between nodes and to increase the number of division in a region.

5.4. Modification 4 (Example in which Flexible Layers are Arranged to interpose Distribution Pressure Sensor therebetween) As described above, as a method for delaying an occurrence timing of a whole slip, there presents a method for increasing a thickness of the flexible layer. On the other hand, when a thickness a flexible layer is large, there presents a problem that the sensitivity of the distribution pressure sensor is reduced.

Figure 14:
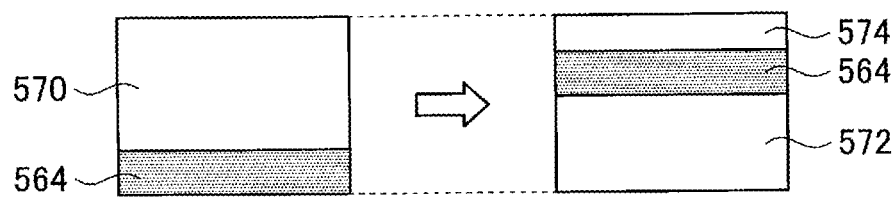
FIG. 14 is a diagram illustrating an example in which flexible layers are arranged on and under a distribution pressure sensor.

In the modification 4, as illustrated in FIG. 14, a part of a thickness of a flexible layer 570 arranged upper than a distribution pressure sensor 564 is arranged lower than the distribution pressure sensor 564, and thus the distribution pressure sensor 564 is arranged vertically between flexible layers 572 and 574. Movement of a pressure-center position depends on a total of thicknesses of the flexible layers 572 and 574, on the other hand, detection sensitivity depends on the flexible layer 574 arranged upper than the distribution pressure sensor 564, and thus an occurrence timing of a whole slip is able to be delayed without reducing detection sensitivity of the distribution pressure sensor 564.

FIG. 15A is a diagram illustrating detection sensitivity by the distribution pressure sensor 564 in accordance with difference in thickness of a flexible layer. In FIG. 15A, there are illustrated detection sensitivity (examples (a) to (c)) when three types of the flexible layers 570 having different thickness are arranged on the distribution pressure sensor 554 and detection sensitivity when the distribution pressure sensor 564 is arranged vertically between the flexible layers 572 and 574 (modification 4).

In the example (a) illustrated in FIG. 15A, the flexible layer 570 having a thickness of 1 mm is arranged on the distribution pressure sensor 564. In the example (b) illustrated in FIG. 15A, the flexible layer 570 having a thickness of 3 mm is arranged on the distribution pressure sensor 564, and in the example (c) illustrated in FIG. 15A, the flexible layer 570 having a thickness of 5 mm is arranged on the distribution pressure sensor 564.

In an example of the modification 4 illustrated in FIG. 15A, the flexible layer 574 having a thickness of 1 mm is arranged on the distribution pressure sensor 564, and the flexible layer 572 having j thickness of 4 mm is arranged under the distribution pressure sensor 564.

In FIG. 15A, with respect to the examples (a) to (c) and the modification 4, a pressure detected by the distribution pressure sensor 564 and a standard deviation thereof are indicated. As indicated in the examples (a) to (c), it is found that the larger a thickness of the flexible layer 570 arranged upper than the distribution pressure sensor 564 is, the larger a standard deviation of detection values of the pressure is and the more detection sensitivity of the distribution pressure sensor 564 is reduced.

On the other hand, as illustrated in FIG. 15A, in the modification 4, although a total thickness of the flexible layer 572 and the flexible layer 574 is the same as that of the example (c), a thickness of the flexible layer 574 arranged upper than the distribution pressure sensor 564 is 1 mm, and thus a standard deviation of detection values of the pressure is restrained. Thus, according to the modification 4, detection sensitivity is able to be obtained, which is similar to that of at least the example (a).

FIG. 15B is a characteristic diagram illustrating states of the examples (a) to (c) and the modification 4 that are illustrated in FIG. 15A, in which a pressure-center position changes similarly to that of FIG. 3B. As indicated by the examples (a) to (c) illustrated in FIG. 15B, the larger a thickness of the flexible layer 570 arranged on the distribution pressure sensor 564 is, the more an occurrence timing of a whole slip delays.

As illustrated in FIG. 15B, an occurrence timing of a whole slip of the modification 4 is a timing similar to that of the example (c). Therefore, according to the modification 4, a thickness of the flexible layer 574 arranged upper than the distribution pressure sensor 564 is equalized to that of the flexible layer 570 of the example (a), so that it is possible to ensure detection sensitivity equivalent to that of the example (a). Moreover, according to the modification 4, a total thickness of the flexible layers 572 and 574 vertically between which the distribution pressure sensor 564 is interposed is equivalent to that of the flexible layer 570 of the example (c), so that it is possible to equalize an occurrence timing of a whole slip of the modification 4 to that of the example (c).

In the feature of the modification 4 illustrated in FIG. 15B, a moving direction of a pressure-center position is reverse to those of the examples (a) to (c). This is caused by effects of pressure applied to a top and a bottom of the distribution pressure sensor 564.

Figure 16A:
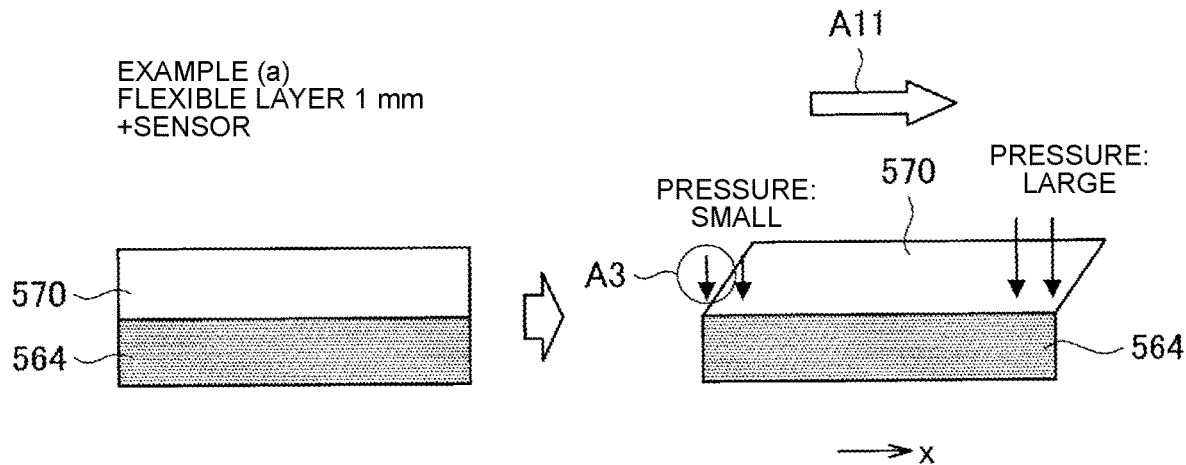
FIG. 16A is a diagram illustrating a reason that a moving direction of a pressure-center position of the modification 4 is reverse to those of the examples (a) to (c).
Figure 16B:
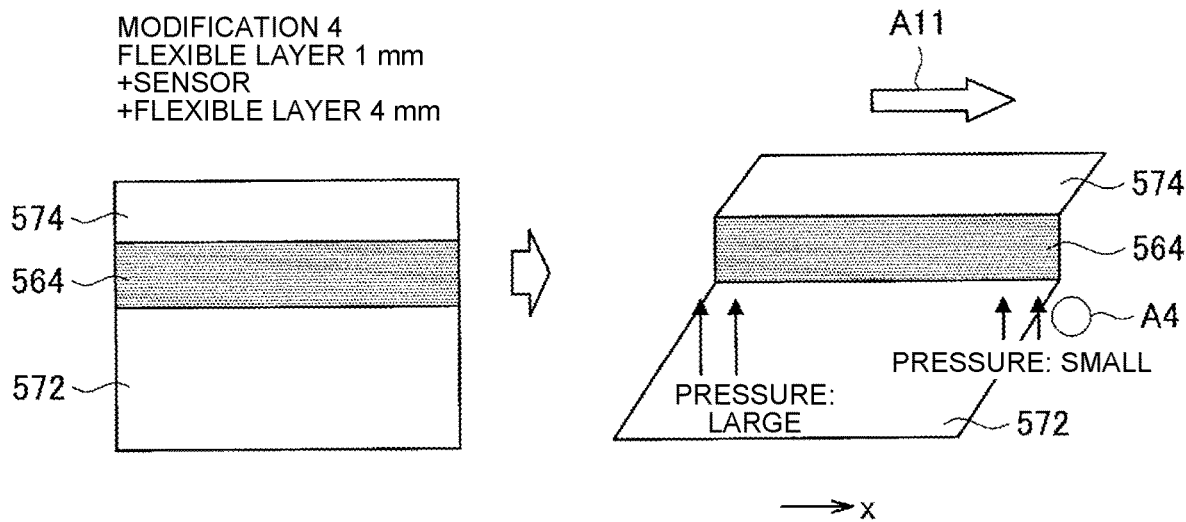
FIG. 16B is a diagram illustrating a reason that a moving direction of a pressure-center position of the modification 4 is reverse to those of the examples (a) to (c).

FIGS. 16A and 16B are diagrams illustrating a reason that a moving direction of a pressure-center position of the modification 4 is reverse to those of the examples (a) to (c). In each of FIGS. 16A and 16B, there are illustrated a state (left part) where the object 600 is not gripped and a state (right part) where the object 600 is gripped, and a state where the object 600 is gripped and the corresponding flexible layer is deformed. In FIGS. 16A and 16B, an arrow A11 indicates a direction in which the object 600 is going to slip. Note that, for convenience of explanation, illustration of the object 600 is omitted in FIGS. 16A and 16B.

FIG. 16A illustrates the example (a), and a state is illustrated in which the object 600 is going to slip in a direction of the arrow A11 and the flexible layer 570 is deformed in the direction of the arrow A11. In this case, there does not present the flexible layer 570 in a region A3 illustrated in FIG. 16A and the pressure becomes small, and thus in a pressure detection value of the distribution pressure sensor 564, a pressure is small in a left edge and a pressure is large in a right edge of the distribution pressure sensor 564. Thus, as illustrated in FIG. 15B, a pressure-center position moves toward a positive direction of the x-axis.

On the other hand, the modification 4 is illustrated in FIG. 16B, and a state is illustrated in which the object 600 is going to slip in a direction of the arrow A11 and the flexible layer 572 and the flexible layer 574 are deformed in the direction of the arrow A11. In this case, there does not present the flexible layer 572 in a region A4 illustrated in FIG. 16B and the pressure becomes small, and thus in a pressure detection value of the distribution pressure sensor 564, a pressure is small in a right edge and a pressure is large in a left edge of the distribution pressure sensor 564. Thus, as illustrated in FIG. 15B, a pressure-center position moves toward a negative direction of the x-axis. In FIG. 15B, a moving direction of a pressure-center position is different from those of the examples (a) to (c) illustrated in FIGS. 3B and 15A; however, a method itself for determining that a whole slip occurs at a time point when movement of a pressure-center position is stopped is similar to those of the examples (a) to (c) illustrated in FIGS. 3B and 15A.

5.5. Modification 5 (Method for Changing Friction Coefficient of Flexible Layer)

As a method for changing a friction coefficient a flexible layer, in addition to a method for changing material, there are considered a method for micro-fabricating a surface of a flexible layer and a method for coating a surface of a flexible layer. Thus, even when a plurality of flexible layers is made of the same material, various distributions of friction coefficients are able be generated.

Figure 17:
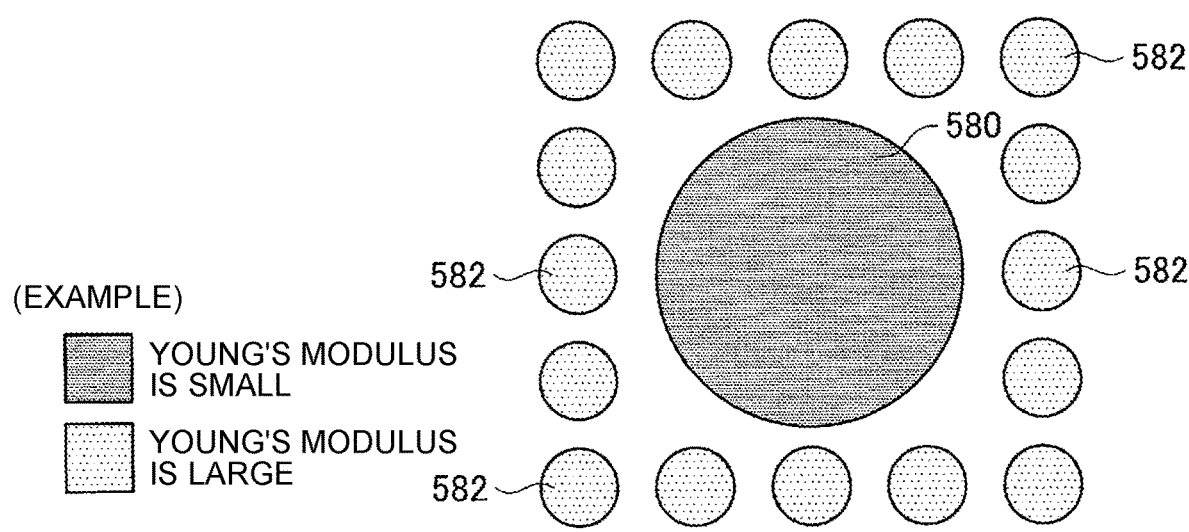
FIG. 17 is a diagram illustrating an example in which a surface area of the flexible layer is changed.

Furthermore, there is exemplified a method for changing a surface area of a region of each of the flexible layers in order to change the frictional force of the corresponding flexible layer. The larger a surface area of a flexible layer is, the larger the frictional force is. FIG. 17 is a diagram illustrating an example in which a surface area of the flexible layer is changed. An area of a center flexible layer 580 is larger than an area of a peripheral flexible layer 582, and thus the frictional force of the center flexible layer 580 is larger than the frictional force of the peripheral flexible layer 582. Thus, it is possible to make an occurrence timing of a whole slip different between the flexible layer 580 and the flexible layer 582.

Figure 18:
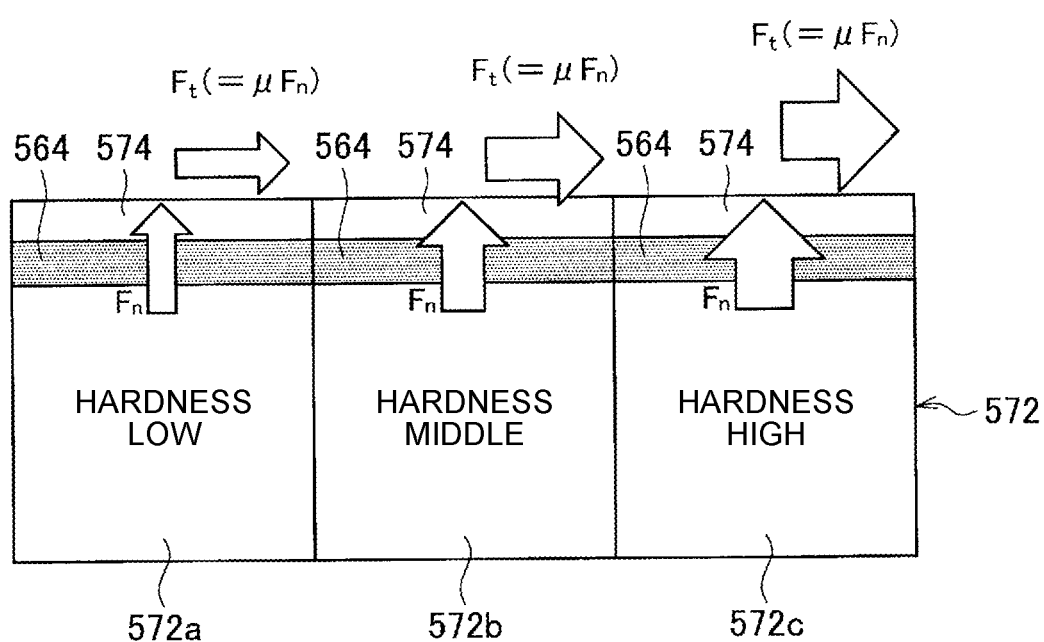
FIG. 18 is a diagram illustrating an example in which the hardness of a lower-part flexible layer of the distribution pressure sensor is changed in order to change frictional force of an upper part flexible layer of the distribution pressure sensor.

Similarly to the modification 4 illustrated in FIG. 14, FIG. 18 illustrates an example in which the distribution pressure sensor 564 is arranged vertically between the flexible layers 572 and 574, and further illustrates a method for changing the hardness of the flexible layer 572 arranged lower than the distribution pressure sensor 564 in order to change the frictional force of the flexible layer 574 arranged upper than the distribution pressure sensor 564. In FIG. 18, the hardness of the flexible layer 572 arranged lower than the distribution pressure sensor 564 are changed into three types of low (flexible layer 572a), middle (flexible layer 572b), and high (flexible layer 572c).

When change amounts of the flexible layers 572a to 572c are constant, the reaction forces Fn generated in the flexible layers 572a to 572c are different from each other, and thus a distribution of the frictional forces Ft ($=Fn \times \mu \cdot Fn$) generated in flexible layers 574a to 574c is able to be generated. Thus, replacement of a flexible layer in a surface is facilitated.

5.6. Modification 6 (Example Using Linear Flexible Layer)

Figure 19:
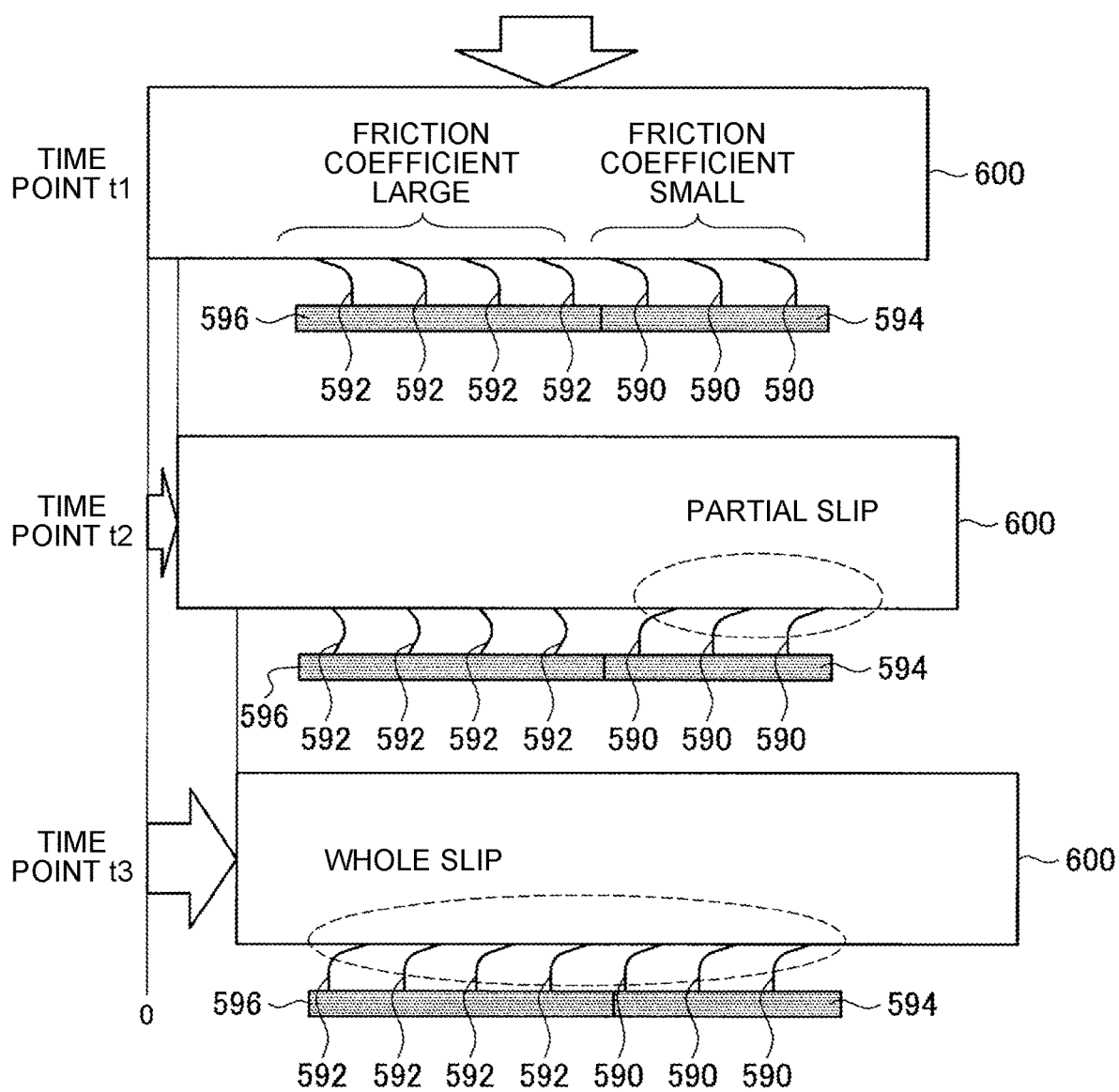
FIG. 19 is a diagram illustrating a configuration example using a linear flexible layer according to a modification 6.

In a modification 6, linear flexible layers are arranged instead of dividing a flexible layer. FIG. 19 is a diagram illustrating a configuration example using linear flexible layers 590 and 592 according to the modification 6. As illustrated in FIG. 19, the linear flexible layers 590 and 592 are arranged on distribution pressure sensors 594 and 596. The flexible layer 590 is arranged on the distribution pressure sensor 594, and the flexible layer 592 is arranged on the distribution pressure sensor 596. The flexible layer 592 is made of a material whose friction coefficient is larger than that of the flexible layer 590.

In FIG. 19, there is illustrated a state where the object 600 is gripped by using the flexible layers 590 and 592. Thus, the object 600 is in contact with the flexible layers 590 and 592 from thereon.

FIG. 19 illustrates chronological movements at a time point t1, a time point t2, and a time point t3. The time point t1 indicates a sticking state. In this state, leading ends of the flexible layers 590 and 592 are uniformly directed toward the left.

Next, the time point t2 indicates a state where a partial slip has occurred on the object 600. In this state, leading ends of the flexible layers 590 whose friction coefficients are small are directed toward the right. On the other hand, leading ends of the flexible layers 592 whose friction coefficients are large keep a state directed to the left. In a case where a slip has partially occurred, when a direction of the flexible layers 590 that is a slipping regional portion is changed, the pressure of the region becomes small, and thus the distribution pressure sensor 594 is able to detect the change.

Next, the time point t3 indicates a state where a whole slip has occurred on the object 600. In this state, the object 600 is slipping in the right direction, and leading ends of the flexible layers 590 and 592 are uniformly directed to the right.

Figure 20:
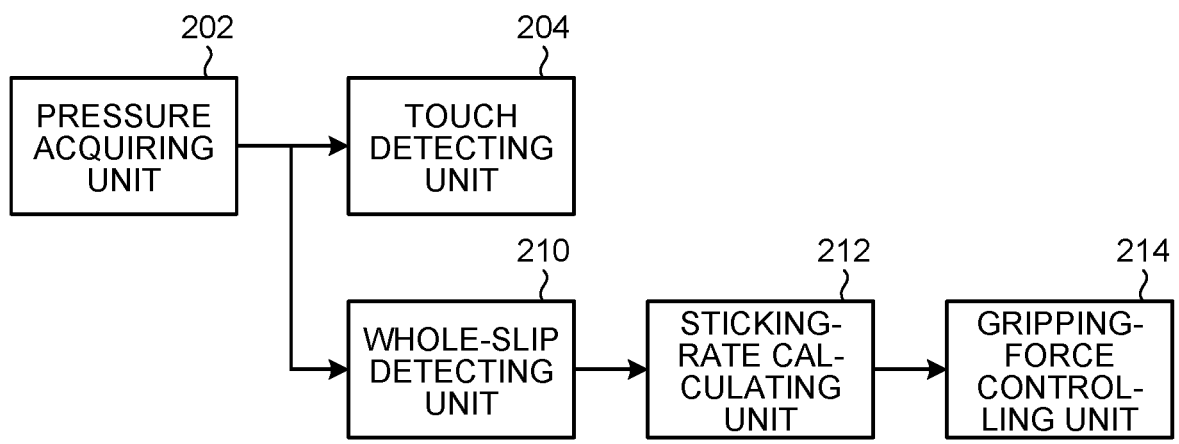
FIG. 20 is a diagram illustrating a configuration of a gripping-force calculating unit using the linear flexible layer illustrated in FIG. 19.

FIG. 20 is a diagram illustrating a configuration of the gripping-force calculating unit 200 using the linear flexible layers 590 and 592 illustrated in FIG. 19. The pressure acquiring unit 202 acquires pressure detected by the distribution pressure sensors 594 and 596. The whole-slip detecting unit 210 monitors change in pressure of the linear flexible layers 590 and 592 so as to detect a slip in each of the flexible layers 590 and 592. As described above, at the time point t2 illustrated in FIG. 19, a pressure detection value of the distribution pressure sensor 594 alone which is corresponding to the flexible layer 590 is reduced, so that it is possible to detect a state of a partial slip. The sticking-rate calculating unit 212 calculates a rate of a non-detection region of a partial slip to all of the regions. The gripping-force controlling unit 214 decides a gripping force such that a sticking rate calculated by the sticking-rate calculating unit 212 is a constant value.

When a pressure detection value is reduced, a whole slip is able to be detected. Change in pressure in each of the linear flexible layers 590 and 592, which is acquired by the pressure acquiring unit 202, is monitored, and when the pressure exceeds a threshold value, a whole slip is detected. The sticking-rate calculating unit 212 calculates a rate of a non detection region of a whole slip to all of the regions. In the example illustrated in FIG. 19, a whole slip occurs in the flexible layer 590 alone at the time point t2, and the flexible layer 592 is in a sticking state. The total number of the flexible layers 590 and 592 is seven, the number of the flexible layers 592 is four, and thus a sticking rate is 57% $\{=(4/7) \times 100\}$.

Figure 21:
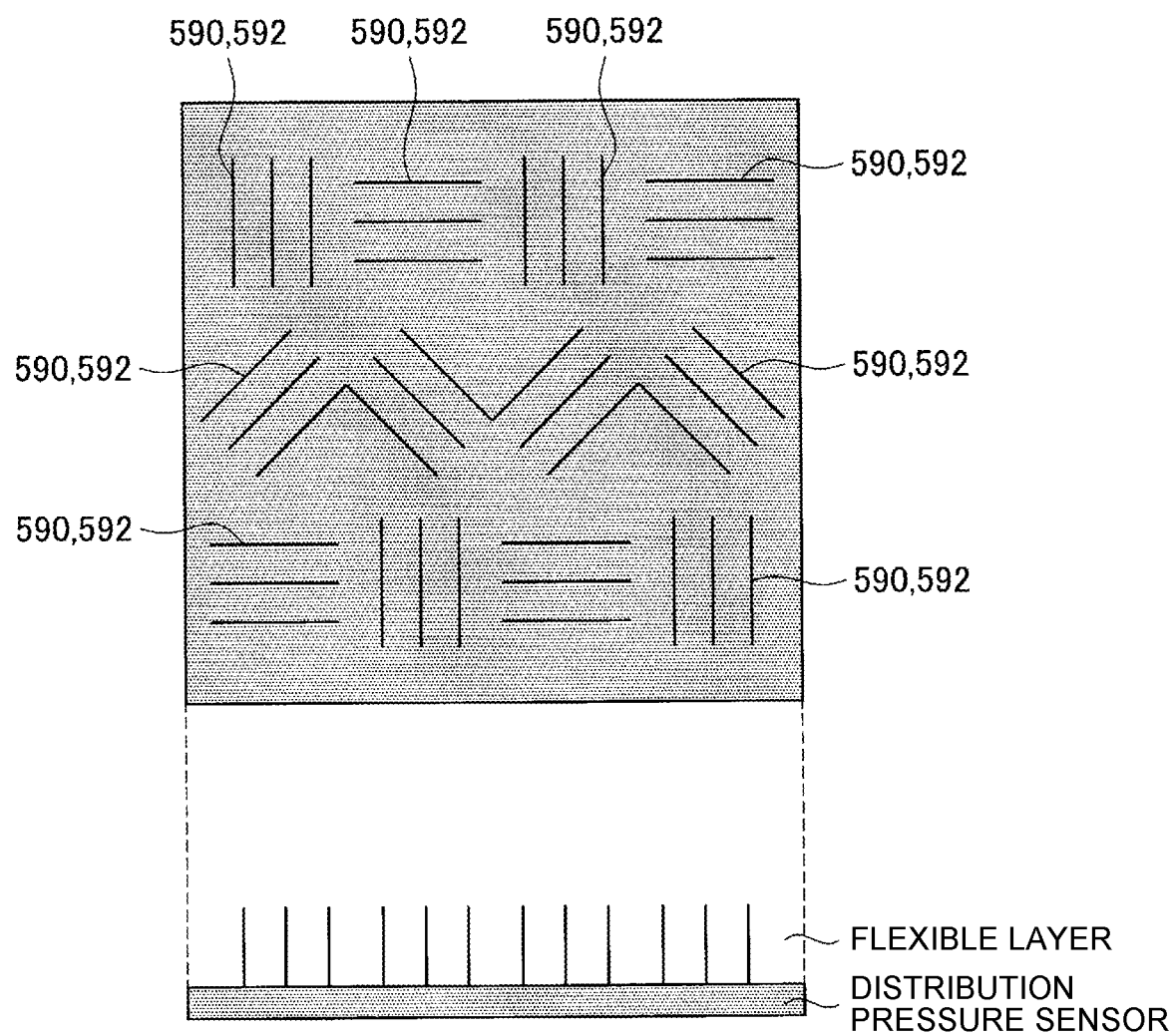
FIG. 21 is a diagram illustrating an example in which flexible layers are arranged in multiple directions in the configuration using the linear flexible layer illustrated in FIG. 19.

FIG. 21 is a diagram illustrating an example in which the flexible layers 590 and 592 are arranged in multiple directions in the configuration using the linear flexible layers 590 and 592 illustrated in FIG. 19. As indicated by the state at the time point t1 illustrated in FIG. 19, in the sticking state, leading ends of the flexible layers 590 and 592 are uniformly directed. As illustrated in FIG. 21, when directions of the flexible layers 590 and 592 in a sticking state are arranged in multiple directions, a configuration capable of corresponding to multiple slipping directions is able to be realized.

As described above, according to the present embodiment, a partial slip of an object is able to be detected on the basis of a simple configuration and a simple calculating process alone, and further a gripping force of an object is able to be appropriately controlled. Moreover, an occurrence timing of a whole slip is made different in a plurality of flexible layers, so that it is possible to detect a partial slip with high accuracy even under various conditions such as in a case of a hard object or an object whose surface is plane, and a case where pressure distribution is flat.

While preferable embodiments of the present disclosure have been described above in detail with reference to the attached drawings, the technical scope of the present disclosure is not limited thereto. It is obvious that those skilled in the technical field of the present disclosure could have conceived of various changes or modifications within the scope of the technical ideas described in the claims, and it is understood that those changes or modifications also reasonably belong to the technical scope of the present disclosure.

For example, in the above-mentioned embodiment, the example is indicated in which a flexible layer and a distribution pressure sensor are provided to the hand 500 that grips the object 600; however, the present technology is not limited to the example. For example, the flexible layer and the distribution pressure sensor may be arranged on a ground contact surface of a too of walking robot so as to detect a slip of the toc. As described above, the present embodiment may be broadly applied for detecting a slip.

The effects described in the present specification are merely explanations or exemplifications, and are not limiting. In other words, the techniques according to the present disclosure may exert other effects that are obvious to those skilled in the art from the descriptions of the present specification, along with the above-described effects or instead of the above-described effects.

The present technology may have the following configurations.

(1)
A controller comprising:
a whole-slip detecting unit that detects, based on pressure information sent from a plurality of regions having different slipping characteristics when an object in contact with the plurality of regions is slipping, a state of a whole slip in which the object is slipping on each of the plurality of regions.

(2)
The controller according to (1), wherein
based on a change in a pressure-center position of each of the plurality of regions, the whole-slip detecting unit detects the state of the whole slip when the corresponding pressure-center position is a constant value.

(3)
The controller according to (2), wherein
when the pressure-center position becomes the constant value within a predetermined time interval, the whole-slip detecting unit detects the state of the whole slip.

(4)
The controller according to any one of (1) to (3), wherein
difference between the slipping characteristics of the plurality of regions makes occurrence timings of whole slips different from each other.

(5)
The controller according to any one of (1) to (4), wherein
the controller is configured to:
when detecting the state of the whole slip in at least one of the plurality of regions and not detecting the state of the whole slip in others of the plurality of regions, determine a state of a partial slip in which the object is partially slipping with respect to the plurality of regions.

(6)
The controller according to (5), wherein
the difference makes occurrence timings of the whole slip in the plurality of regions different, and
the controller is further configured to:
based on difference between the timings, determine the state of the partial slip.

(7)
The controller according to any one of (1) to (6), wherein
the controller is further configured to:
when not detecting the state of the whole slip in any of the plurality of regions, determine a sticking state in which the object and the plurality of regions are sticking to each other.

(8)
The controller according to any one of (1) to (7), further comprising:
a sticking-rate calculating unit that calculates a sticking rate between the object and one of the plurality of regions based on a rate of a non-detection region of the state of the whole slip to all of the plurality of regions.

(9)
The controller according to (8), further comprising:
a gripping-force controlling unit that controls, based on the sticking rate, a gripping force in gripping the object by using a gripping unit that grips the object to which the plurality of regions is provided.

(10)
The controller according to (9), wherein
the gripping-force controlling unit controls the gripping force such that the sticking rate is a predetermined value.

(11)
The controller according to (9), further comprising:
an acquisition unit that acquires a rigidity of the object, wherein
the gripping-force controlling unit controls the gripping force based on the rigidity.

(12)
The controller according to (11), wherein
the gripping-force controlling unit more lowers an increase rate when increasing the gripping force, as the rigidity of the object is lower.

(13)
The controller according to any one of (1) to (12), further comprising:
a pressure-gradient calculating unit that calculates a pressure gradient when the object is in contact with the plurality of regions; and
a control unit that controls, based on the pressure gradient, a position in which the plurality of regions is in contact with the object.

(14)
The controller according to (13), wherein
the control unit is configures to:
cause one of the plurality of regions to be in contact with a first part of the object whose pressure gradient is low; and
cause others of the plurality of regions to be in contact with a second part of the object whose pressure gradient is higher than the pressure gradient of the first part.

(15)
The controller according to any one of (1) to (14), wherein
the plurality of regions is aligned along a slipping direction of the object.

(16)
The controller according to any one of (1) to (15), wherein
at least one of a friction coefficient, a Young's modulus, a Poisson ratio, a thickness, and a curvature included in the slipping characteristics is different for each of the plurality of regions.

(17)
A control method comprising:
based on pressure information sent from a plurality of regions having different slipping characteristics when an object in contact with the plurality of regions is slipping, detecting a state of a whole slip in which the object is slipping on each of the plurality of regions.

(18)

A program allowing a computer to function as:

a means for detecting, based on pressure information sent from a plurality of regions having different slipping characteristics when an object in contact with the plurality of regions is slipping, a state of a whole slip in which the object is slipping on each of the plurality of regions.

REFERENCE SIGNS LIST

210 Whole-slip detecting unit
212 Sticking-rate calculating unit
214 Gripping-force controlling unit
222 Pressure-gradient calculating unit
224 Actuator controlling unit.

The invention claimed is:

1. A controller comprising:
circuitry configured to detect, based on pressure information sent from a plurality of regions having different slipping characteristics when an object in contact with the plurality of regions is slipping, a state of a whole slip in which the object is slipping on each of the plurality of regions,
acquire a rigidity of the object, and
control a gripping force in gripping the object by using the plurality of regions,
wherein the circuitry controls the gripping force based on the rigidity of the object, and
wherein the circuitry is further configured to lower an increase rate when increasing the gripping force, as the rigidity of the object is lower.

2. The controller according to claim 1, wherein
based on a change in a pressure-center position of each of the plurality of regions, the circuitry detects the state of the whole slip when the corresponding pressure-center position is a constant value.

3. The controller according to claim 2, wherein
when the pressure-center position becomes the constant value within a predetermined time interval, the circuitry detects the state of the whole slip.

4. The controller according to claim 1, wherein
difference between the slipping characteristics of the plurality of regions makes occurrence timings of whole slips different from each other.

5. The controller according to claim 1, wherein
the circuitry is further configured to:
when detecting the state of the whole slip in at least one of the plurality of regions and not detecting the state of the whole slip in others of the plurality of regions, determine a state of a partial slip in which the object is partially slipping with respect to the plurality of regions.

6. The controller according to claim 5, wherein
the difference makes occurrence timings of the whole slip in the plurality of regions different, and
the circuitry is further configured to:
based on difference between the timings, determine the state of the partial slip.

7. The controller according to claim 1, wherein
the circuitry is further configured to:
when not detecting the state of the whole slip in any of the plurality of regions, determine a sticking state in which the object and the plurality of regions are sticking to each other.

8. The controller according to claim 1, wherein the circuitry is further configured to
calculate a pressure gradient when the object is in contact with the plurality of regions, and
control, based on the pressure gradient, a position in which the plurality of regions is in contact with the object.

9. The controller according to claim 8, wherein
the circuitry is further configured to
cause one of the plurality of regions to be in contact with a first part of the object whose pressure gradient is low, and
cause others of the plurality of regions to be in contact with a second part of the object whose pressure gradient is higher than the pressure gradient of the first part.

10. The controller according to claim 1, wherein
the plurality of regions is aligned along a slipping direction of the object.

11. The controller according to claim 1, wherein
at least one of a friction coefficient, a Young's modulus, a Poisson ratio, a thickness, or a curvature included in the slipping characteristics is different for each of the plurality of regions.

12. A control method comprising:
detecting, based on pressure information sent from a plurality of regions having different slipping characteristics when an object in contact with the plurality of regions is slipping, a state of a whole slip in which the object is slipping on each of the plurality of regions;
acquiring a rigidity of the object; and
controlling a gripping force in gripping the object by using the plurality of regions,
wherein the gripping force is controlled based on the rigidity of the object, and
wherein an increase rate when increasing the gripping force is lowered, as the rigidity of the object is lower.

13. A non-transitory computer-readable storage medium having embodied thereon a program, which when executed by a computer causes the computer to executed a method, the method comprising:
detecting, based on pressure information sent from a plurality of regions having different slipping characteristics when an object in contact with the plurality of regions is slipping, a state of a whole slip in which the object is slipping on each of the plurality of regions;
acquiring a rigidity of the object; and
controlling a gripping force in gripping the object by using the plurality of regions,
wherein the gripping force is controlled based on the rigidity of the object, and
wherein an increase rate when increasing the gripping force is lowered, as the rigidity of the object is lower.

14. The controller according to claim 1,
wherein the circuitry controls the gripping force further based on a sticking rate related to the plurality of regions.

15. The controller according to claim 14,
wherein the circuitry is further configured to calculate the sticking rate between the object and one of the plurality of regions based on a rate of a non-detection region of the state of the whole slip to all of the plurality of regions.

16. The controller according to claim 14,
wherein the circuitry controls, based on the sticking rate, the gripping force in gripping the object by using a gripping unit that grips the object to which the plurality of regions is provided.

17. The controller according to claim 16, wherein the circuitry controls the gripping force such that the sticking rate is a predetermined value.

\* \* \* \* \*